United States Patent
Skataric et al.

(10) Patent No.: US 10,995,606 B2
(45) Date of Patent: May 4, 2021

(54) WELL INTEGRITY ANALYSIS USING SONIC MEASUREMENTS OVER DEPTH INTERVAL

(71) Applicant: SCHLUMBERGER TECHNOLOGY CORPORATION, Sugar Land, TX (US)

(72) Inventors: Maja Skataric, Cambridge, MA (US); Sandip Bose, Brookline, MA (US); Smaine Zeroug, Lexington, MA (US); Bikash Kumar Sinha, Cambridge, MA (US); Ram Sunder Kalyanaraman, Richmond, TX (US); Erik Wielemaker, The Hague (NL)

(73) Assignee: Schlumberger Technology Corporation, Sugar Land, TX (US)

( * ) Notice: Subject to any disclaimer, the term of this patent is extended or adjusted under 35 U.S.C. 154(b) by 435 days.

(21) Appl. No.: 16/080,104

(22) PCT Filed: Mar. 2, 2017

(86) PCT No.: PCT/US2017/020311
§ 371 (c)(1),
(2) Date: Aug. 27, 2018

(87) PCT Pub. No.: WO2017/151834
PCT Pub. Date: Sep. 8, 2017

(65) Prior Publication Data
US 2019/0055830 A1 Feb. 21, 2019

Related U.S. Application Data

(60) Provisional application No. 62/303,152, filed on Mar. 3, 2016.

(51) Int. Cl.
*G01V 1/28* (2006.01)
*G01V 1/46* (2006.01)
(Continued)

(52) U.S. Cl.
CPC ............ *E21B 47/005* (2020.05); *G01V 1/282* (2013.01); *G01V 1/284* (2013.01); *G01V 1/46* (2013.01);
(Continued)

(58) Field of Classification Search
CPC ...... E21B 47/005; G01V 1/282; G01V 1/284; G01V 1/46; G01V 1/50; G01V 2210/1299;
(Continued)

(56) References Cited

U.S. PATENT DOCUMENTS

| 3,909,775 A | 9/1975 | Lavigne |
| 4,289,023 A | 9/1981 | Rader |

(Continued)

FOREIGN PATENT DOCUMENTS

| BR | 112018067500 A2 * | 1/2019 | ........... E21B 47/005 |
| GB | 201814155 | * 10/2018 | ........... E21B 47/005 |

(Continued)

OTHER PUBLICATIONS

"Isolating Potential Flow Zones During Well Construction", in American Petroleum Institute Recommended Practice 65—Part 2, first Edition, May 2010, 107 pages.
(Continued)

*Primary Examiner* — Daniel Pihulic
(74) *Attorney, Agent, or Firm* — Trevor G. Grove

(57) ABSTRACT

Methods are provided for using sonic tool data to investigate a multi-string wellbore. The sonic data is processed to obtain indications of phase slowness dispersions for multiple locations in the wellbore. The dispersions are aggregated. The aggregated dispersions are compared with a plurality of cut-off mode templates to identify the presence of cut-off modes or the lack thereof in the aggregated phase slowness dispersions. Features of the multi-string wellbore are iden- (Continued)

tified based on the presence of the cut-off modes or the lack thereof. In another method, the sonic data is processed to obtain indications as a function of depth of at least one of an energy spectrum, a semblance projection, a slowness dispersion projection, an attenuation dispersion projection, and a wavenumber dispersion projection. The indications are inspected to locate a shift at a particular depth indicat- ing a transition in at least oneannulus of the multi-string wellbore.

23 Claims, 26 Drawing Sheets

(51) Int. Cl.
*G01V 1/50* (2006.01)
*E21B 47/00* (2012.01)
*E21B 47/005* (2012.01)

(52) U.S. Cl.
CPC ........ *G01V 1/50* (2013.01); *G01V 2210/1299* (2013.01); *G01V 2210/1429* (2013.01); *G01V 2210/48* (2013.01); *G01V 2210/614* (2013.01)

(58) Field of Classification Search
CPC ..... G01V 2210/1429; G01V 2210/614; G01V 2210/48
See application file for complete search history.

(56) References Cited

U.S. PATENT DOCUMENTS

| | | | |
|---|---|---|---|
| 4,594,691 A | 6/1986 | Kimball et al. | |
| 4,800,537 A | 1/1989 | Mount, II | |
| 4,896,303 A | 1/1990 | Leslie et al. | |
| 5,278,805 A | 1/1994 | Kimball | |
| 6,611,761 B2 | 8/2003 | Sinha et al. | |
| 6,941,231 B2 | 9/2005 | Zeroug et al. | |
| 7,095,676 B2 | 8/2006 | DAngelo et al. | |
| 7,639,563 B2 | 12/2009 | Wu et al. | |
| 7,643,374 B2 | 1/2010 | Plona et al. | |
| 9,533,487 B2 | 1/2017 | Knauer et al. | |
| 9,784,875 B2 | 10/2017 | Zeroug et al. | |
| 9,829,597 B2 | 11/2017 | Zeroug et al. | |
| 10,012,749 B2 | 7/2018 | Bose et al. | |
| 10,138,727 B2 | 11/2018 | Zeroug et al. | |
| 2002/0116128 A1 | 8/2002 | Sinha et al. | |
| 2003/0058739 A1 | 3/2003 | Hsu et al. | |
| 2003/0185100 A1 | 10/2003 | DAngelo et al. | |
| 2005/0190651 A1 | 9/2005 | Plona et al. | |
| 2006/0039238 A1 | 2/2006 | Mandal et al. | |
| 2006/0120217 A1 | 6/2006 | Wu et al. | |
| 2006/0233048 A1 | 10/2006 | Froelich et al. | |
| 2006/0235617 A1 | 10/2006 | Sinha et al. | |
| 2006/0262644 A1 | 11/2006 | Schoepf et al. | |
| 2007/0206439 A1 | 9/2007 | Barolak et al. | |
| 2009/0168597 A1 | 7/2009 | Wu et al. | |
| 2013/0255937 A1 | 10/2013 | Barnes et al. | |
| 2013/0345983 A1 | 12/2013 | Guo | |
| 2014/0052376 A1 | 2/2014 | Guo et al. | |
| 2015/0003203 A1 | 1/2015 | Froelich | |
| 2015/0198032 A1* | 7/2015 | Sinha .................. | E21B 47/005 166/250.01 |
| 2015/0198732 A1 | 7/2015 | Zeroug et al. | |
| 2015/0219780 A1 | 8/2015 | Zeroug et al. | |
| 2017/0108607 A1* | 4/2017 | Frisch .................. | G01V 1/50 |
| 2017/0167241 A1 | 6/2017 | Wu et al. | |
| 2018/0142545 A1 | 5/2018 | Lei et al. | |
| 2018/0149019 A1 | 5/2018 | Bose et al. | |
| 2018/0156759 A1 | 6/2018 | Lei et al. | |
| 2019/0055830 A1* | 2/2019 | Skataric ............... | G01V 1/282 |

FOREIGN PATENT DOCUMENTS

| | | | | |
|---|---|---|---|---|
| GB | 2563763 A | * | 12/2018 | .......... E21B 47/005 |
| WO | 2014139593 A1 | | 9/2014 | |
| WO | 2015108639 A1 | | 7/2015 | |
| WO | 2016003549 A1 | | 1/2016 | |
| WO | 2016187239 A1 | | 11/2016 | |
| WO | 2016187240 A1 | | 11/2016 | |
| WO | 2016187242 A1 | | 11/2016 | |
| WO | WO-2017151834 A1 | * | 9/2017 | ............. G01V 1/284 |

OTHER PUBLICATIONS

Ekstrom, M. P., "Dispersion estimation from borehole acoustic arrays using a modified matrix pencil algorithm", 29th Asilomar Conference on Signals, Systems, and Computers, Pacific Grove, California, U.S.A., 1995, pp. 449-453.
Hayman, A. J. et al., "High Resolution Cementation and Corrosion Imaging by Ultrasound", presented at the 1991 SPWLA 32nd Annual Logging Symposium, 1991, 25 pages.
Lang, S. et al., "Estimating slowness dispersion from arrays of sonic logging waveforms", Geophysics, 1987, 52(4), pp. 530-544.
Liu, Y. et al., "Acoustic Guided Waves in Cylindrical Solid-Fluid Structures: Modeling with a Sweeping Frequency Finite Element Method and Experimental Validation", AIP Conference Proceedings, 2017, 36, 8 pages.
Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.
Pistre, V. et al., "A New Modular Sonic Tool Provides Complete Acoustic Formation Characterization", 2005 SEG International Exposition and Annual Meeting Proceedings, SEG Houston, Texas, U.S.A., 2005, pp. 368-372.
Van Kuijk, R. et al., "A Novel Ultrasonic Cased-Hole Imager for Enhanced Cement Evaluation", IPTC 10546, presented at the International Petroleum Technolgy Conference, Doha, Qatar, 2005, 14 pages.
Search Report and Written Opinion of related International Patent Application No. PCT/US2016/032963 dated Aug. 16, 2016, 21 pages.
Search Report and Written Opinion of related International Patent Application No. PCT/US2016/032961 dated Sep. 26, 2016,18 pages.
Search Report and Written Opinion of related International Patent Application No. PCT/US2016/032965 dated Aug. 16, 2016, 17 pages.

* cited by examiner

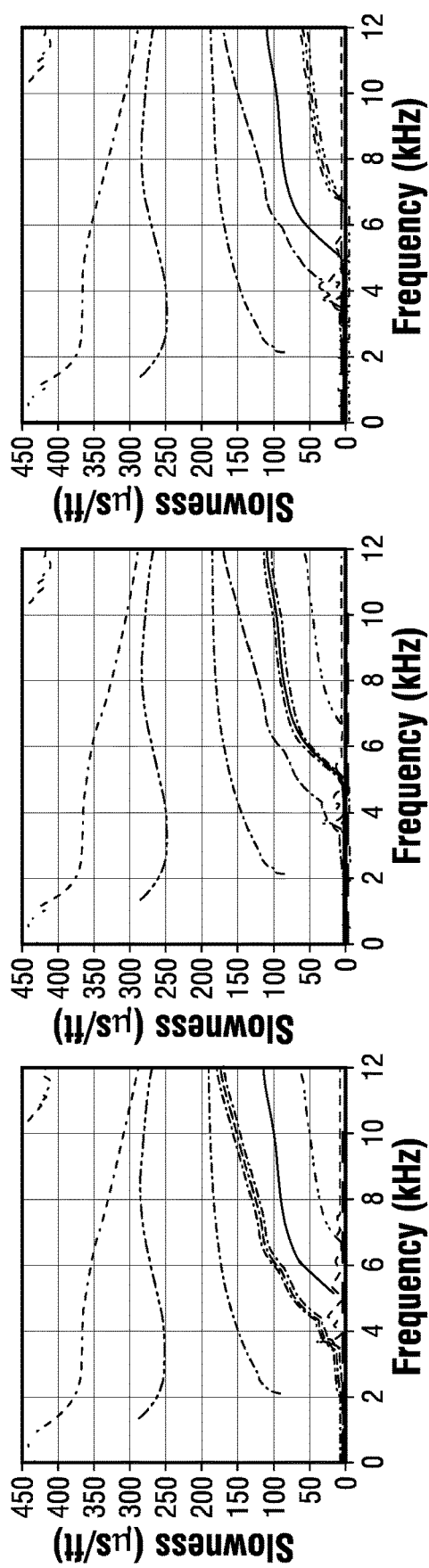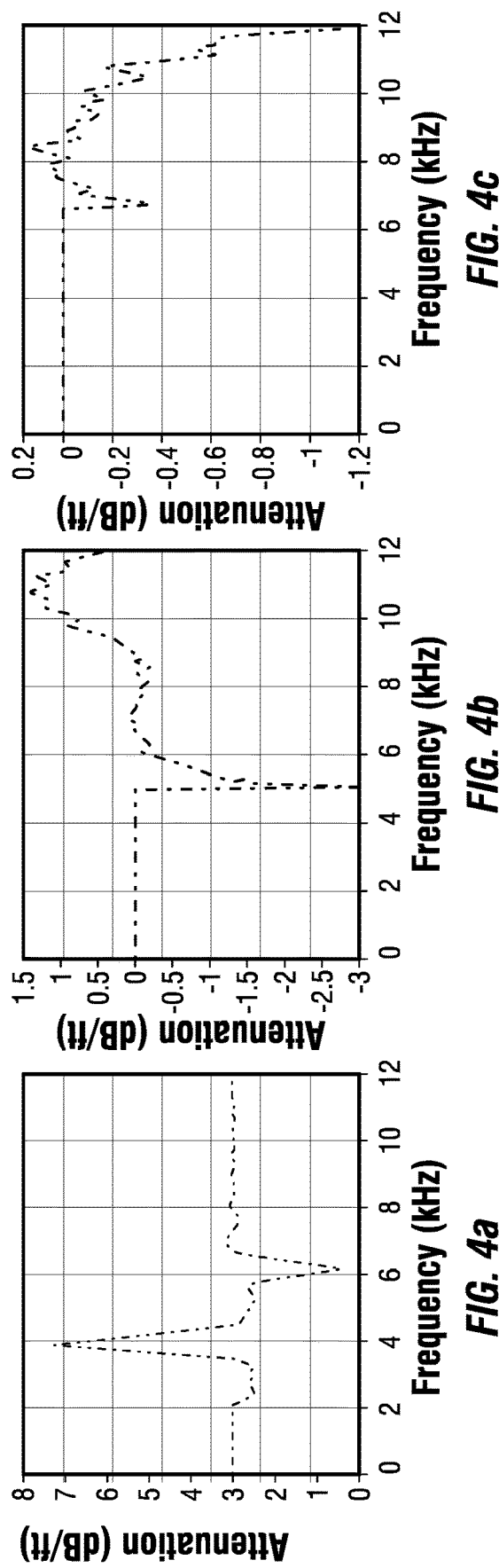
FIG. 4a  FIG. 4b  FIG. 4c

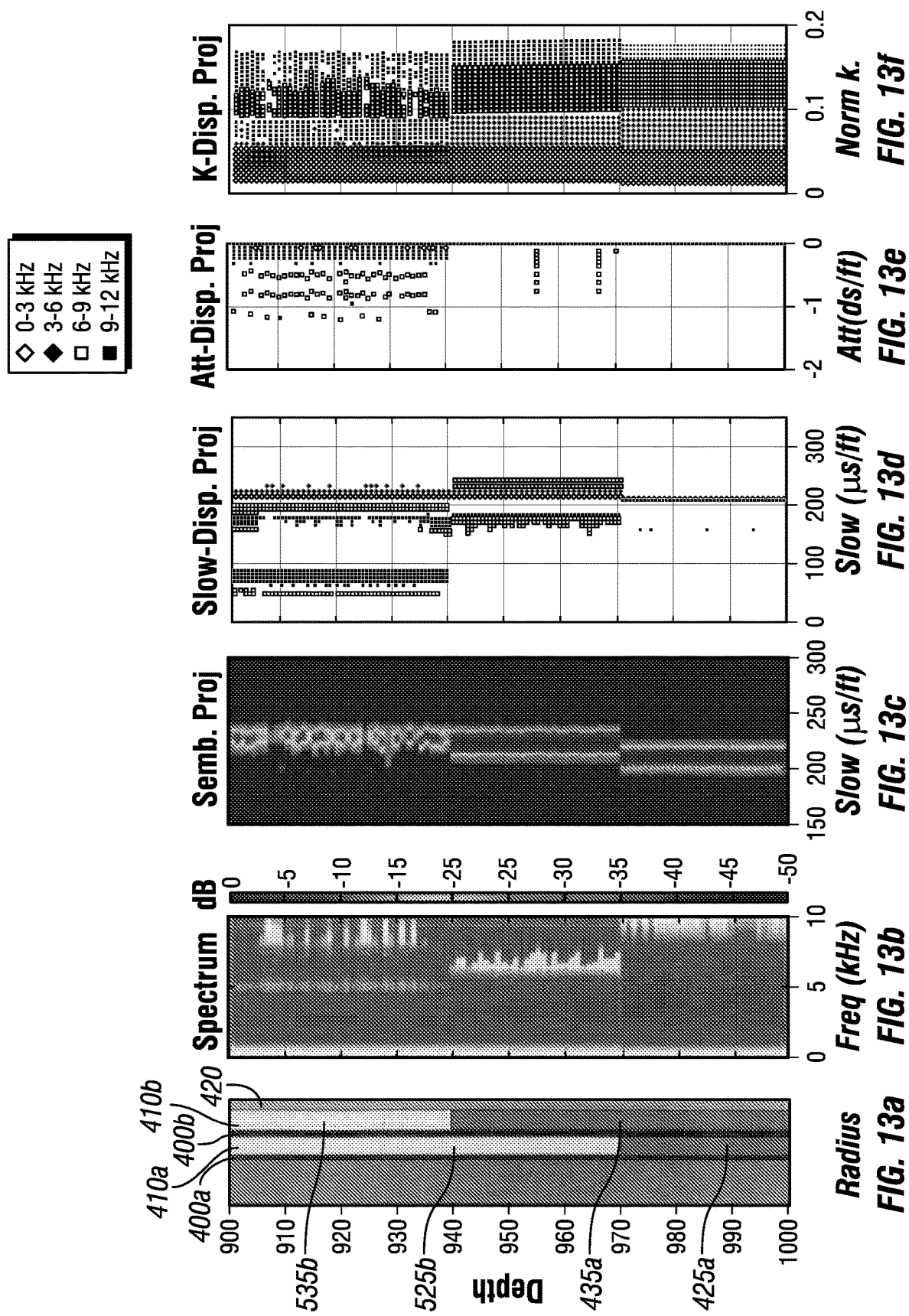

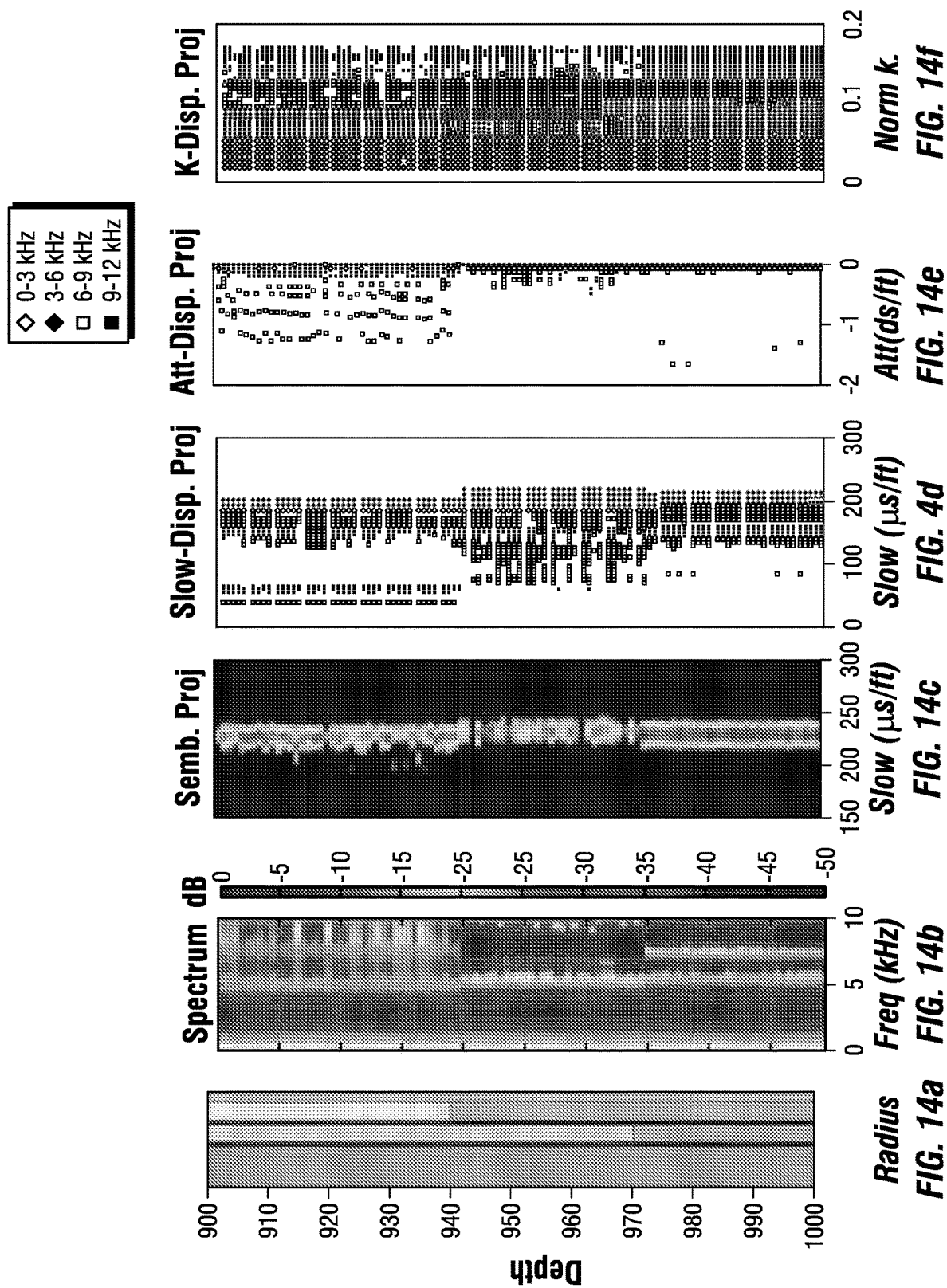

WELL INTEGRITY ANALYSIS USING SONIC MEASUREMENTS OVER DEPTH INTERVAL

This application claims priority to U.S. Ser. No. 62/303,152 filed Mar. 3, 2016, which is hereby incorporated by reference herein in its entirety.

TECHNICAL FIELD

The subject disclosure relates to methods for determining the integrity of wells traversing earth formations. The subject disclosure more particularly relates to methods of analyzing the integrity of wells utilizing sonic measurements.

BACKGROUND

Effective diagnosis of well zonal isolation has become critical with the recent advent of tougher governmental regulations that call for oil and gas operators to deliver and maintain wells with competent pressure seals. The goal of the governmental regulations is to prevent uncontrolled and undesirable flow of subterranean formation fluids causing leaks into the atmosphere or into other formation zones. Hydraulic isolation of formation zones from each other is typically conducted through placement of cement in the annular space between the casings and the formation. Diagnosis of well zonal isolation can be carried out at one or more times, including following a cementation job, during the life of a well, and at the end of the life of the well prior to plugging and abandonment of the well.

Acoustic measurements have been used to diagnose the condition and placement of the cement and its bond to interfaces in contact with it. The current methods include using a low frequency sonic logging tool such as the SONIC SCANNER tool of Schlumberger Technology Corporation to generate a log such as the Cement Bond Log (CBL) as well as the Variable Density Log (VDL). See, e.g., Pistre, V. et al., "A Modular Wireline Sonic Tool for Measurements of 3D Formation Acoustic Properties," *SPWLA 46$^{th}$ Annual Logging Symposium*, New Orleans, June 2005. These measurements have been used and interpreted for cement evaluation through a single casing. Ultrasonic measurements have also been utilized but because of their high-frequency character are designed for single casings and therefore such designs can be used at best only for the diagnosis of the annulus behind the innermost casing and the bonds thereof. However, in a number of markets, including plug and abandonment, there is increasing interest in diagnosing the placement and bond of cement behind more than one casing to avoid costly operations of cutting and pulling casing and multiple logging runs. In order to address this market, there is a need for additional measurements and/or processing approaches that leverage the possibility of probing deeper than the first casing and annulus while addressing the challenges of diagnosing the cement placement behind second casings despite the increased complexity of the measurement physics in multiple casing strings.

Recently, some of the inventors hereof have proposed a joint diagnosis of multiple acoustic modalities in order to leverage the independent sensitivities of those acoustic modalities. See, e.g., U.S. Patent Application Publication No. 2015/0219780 entitled "Acoustic Multi-Modality Measurement for Cement Integrity Analysis". The anticipated result is a more robust diagnosis of the content of the annulus and whether it provides hydraulic isolation based on quantitative inversion of relevant parameters. Indeed, U.S. Patent Application Publication No. 2015/0219780 proposes a model-based inversion of the relevant parameters and may be used when adequate computation is available to run physically realistic forward models to carry out a complete inversion. However, it will be appreciated that continuous logs covering thousands of feet along the well are often generated and, in some circumstances, it may not be feasible with the available computational resources to invert beyond a few selected locations. For such a scenario, to cover the tens of thousands of depth frames, some of the inventors hereof have proposed a different approach of extracting attributes or features from all the available measurements and using those in machine learning algorithms to make a categorical diagnosis of not only the first annulus but also the annuli and bond conditions beyond the second casing. See, e.g., PCT Application Publication No. WO 2016/0187242, published Nov. 24, 2016, entitled "Method for Analyzing Cement Integrity in Casing Strings Using Machine Learning." In addition, the sonic measurements are in themselves quite rich as they include monopole and dipole logging modes that interrogate the cased hole system in diverse ways, enabling such a diagnosis. Some of the inventors hereof have proposed techniques employing those sonic data measurements for the purpose of diagnosing the integrity of the well. See, e.g., U.S. Patent Application Publication No. 2015/0198732, published Jul. 16, 2015, entitled "Cement Acoustic Properties from Ultrasonic Signal Amplitude Dispersions in Cased Wells"; PCT Application Publication No. WO 2016/187240, published Nov. 24, 2016, entitled "Method for Analyzing Cement Integrity in Cased Wells using Sonic Logging"; and PCT Application Publication No. WO 2016/187239, published Nov. 24, 2016, entitled "Methods for Analyzing Cement Quality in Multi-String Cased Wells Using Sonic Logging."

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods are provided for evaluating the well integrity of dual and multi-string casings using sonic data that reaches deeper into the formation than the first casing and annulus. The sonic data comprises one or more of monopole, dipole, and quadrupole modalities. In one embodiment, the sonic data is processed to obtain phase slowness dispersions. The dispersions are aggregated along selected lengths of the wellbore that are of interest and plotted together. Templates corresponding to cut-off modes pertaining to the casing are generated from modeling data using scenarios of one or more free pipes in the multiple casing string configuration. The templates are overlaid on the aggregated slowness dispersion data for the wellbore area of interest and a tight match of the measured dispersions with one or more template cut-off modes is an indicator of the corresponding scenario in the multi-string configuration at the area of interest.

In one embodiment, the sonic data is processed in order to generate plots of one or more of slowness, attenuation, and wavenumber projection, or of the energy spectrum. The appearance of discontinuities in the plots are indicative of depth dependent changes such as the change of an annular fill or bond, or the location of the top of the cement.

In one embodiment, after finding discontinuities in the plots of one or more of the slowness, attenuation and wavenumber projection, the areas of discontinuity (sections of interest) are analyzed by aggregating dispersions for each section of interest and plotting the aggregated dispersions in an overlay plot. Templates corresponding to cut-off modes pertaining to the casing are generated from modeling data using scanarios of one or more free pipes in the multiple casing string configuration. The templates are overlaid on the dispersion. A tight match of the measured dispersions with one or more template cut-off modes is an indicator of the corresponding scenario in the multi-string configuration.

In one aspect, the provided methods for evaluating the well integrity of dual and multi-string casings use sonic data in the context of depth, thereby taking advantage of the depth dependence of phenomena of particular pertinence to well integrity. In one aspect, in using the sonic data in the context of depth, aggregation of signals can be used.

Additional aspects, embodiments, objects and advantages of the disclosed methods may be understood with reference to the following detailed description taken in conjunction with the provided drawings.

BRIEF DESCRIPTION OF THE DRAWINGS

FIGS. 4a-4c are plots highlighting different cut-off modes and showing their respective attenuation dispersions with the top panels showing slowness versus frequency and the bottom panels showing attenuation versus frequency.

FIGS. 13a-13f are displays showing details of a wellbore over a particular depth interval (13a), and a resulting spectrum (13b), semblance projection (13c), slowness dispersion projection (13d), attentuation dispersion projection (13e) and wavenumber dispersion projection as a function of depth (13f).

FIGS. 14a-14f are displays similar to those of FIGS. 13a-13f but where the cement in the annuli is lighter than the cement of FIGS. 13a-13f, and the resulting spectrum and projections therefore differ.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1A:
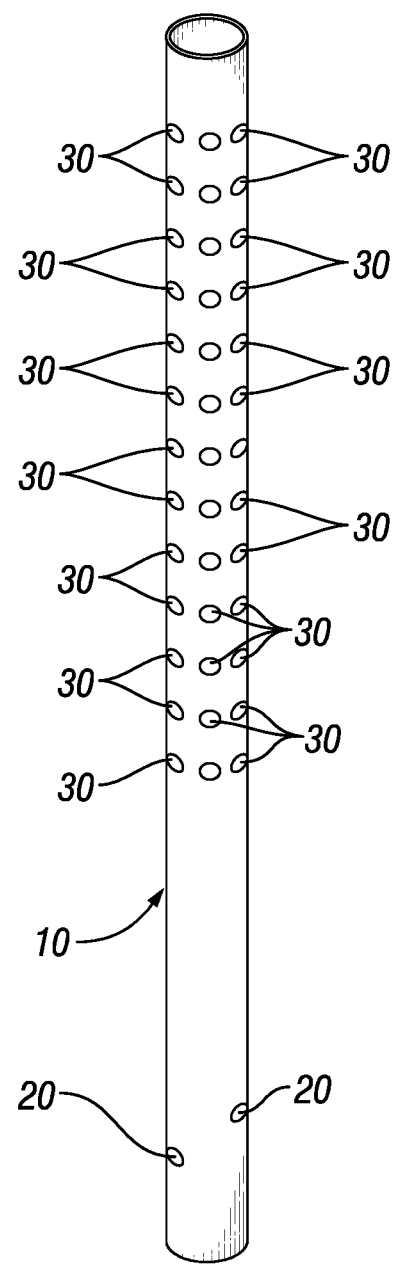
FIGS. 1a-1f are respectively a schematic of a sonic tool (1a), plots of high and low frequency monopole waveform acquisitions (1b, 1c), and plots of high and low frequency cross dipole waveform acquisitions (1d, 1e), and a dispersion plot (1f).
Figure 1B:
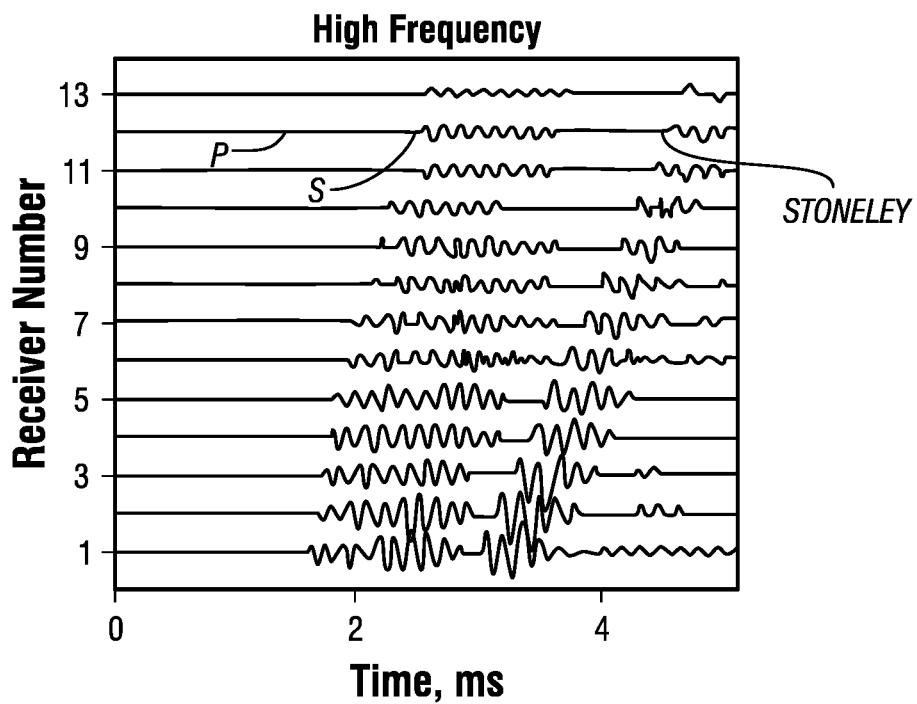
Figure 1C:
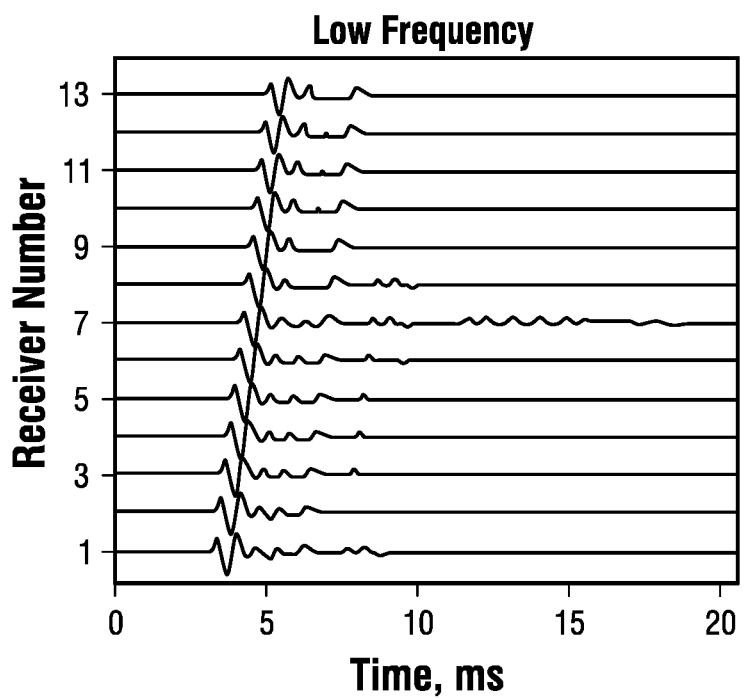
Figure 1D:
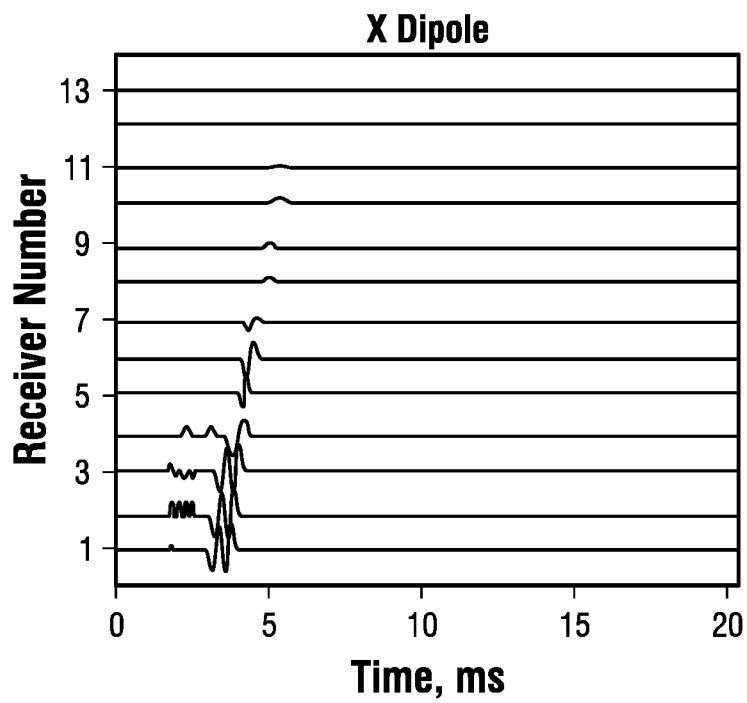
Figure 1E:
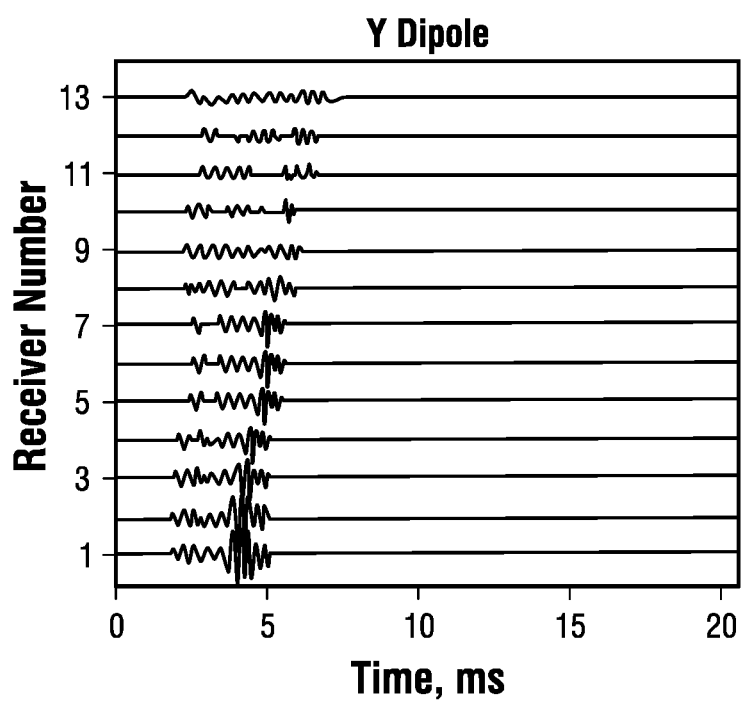
Figure 1F:
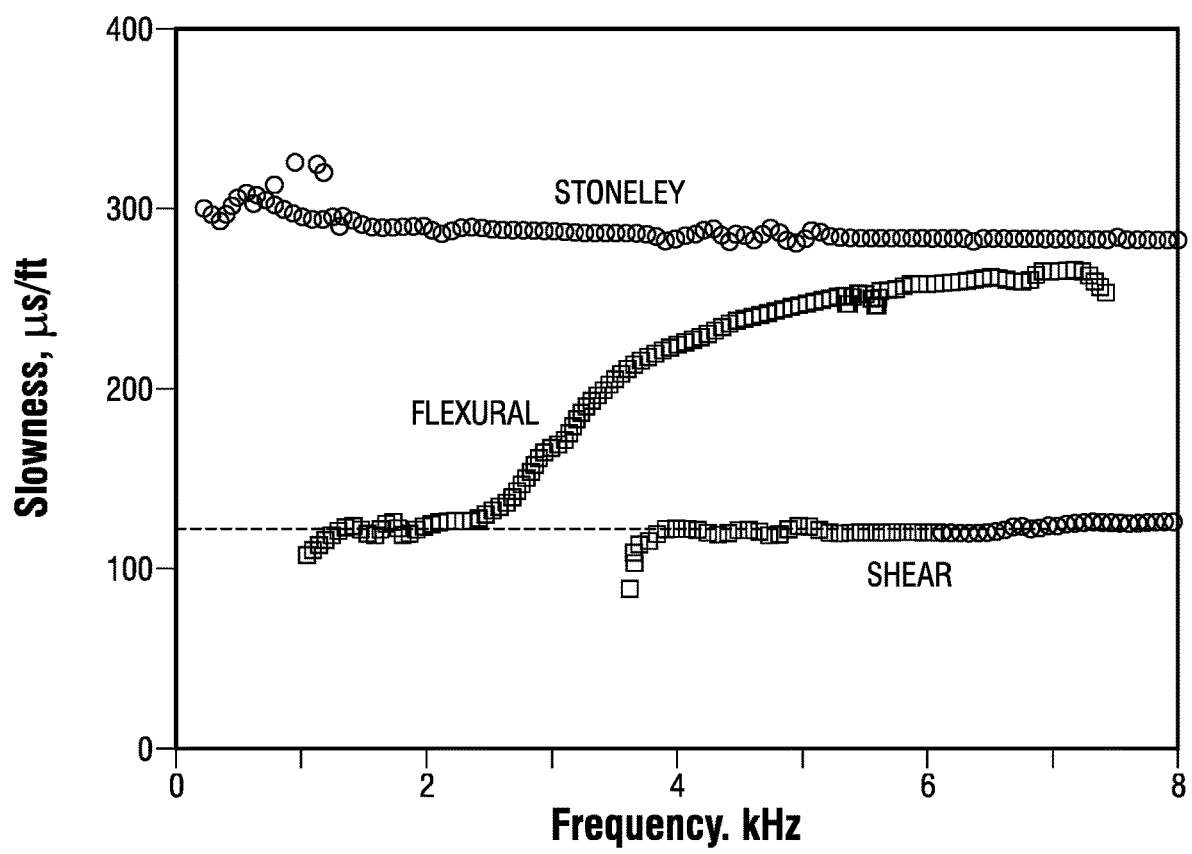

Turning to FIG. 1a, a sonic tool 10 is shown having at least one sonic source 20 and a plurality of spaced sonic detectors 30. The sonic tool 10 may be implemented as a wireline type tool or a logging while drilling (LWD) tool, such as the SONIC SCANNER tool of Schlumberger Technology Corporation which includes both an axial and azimuthal array of receivers. In one embodiment, the sonic tool has a signal frequency range from 200 Hz to 12 kHz, although tools of different frequency ranges may be utilized. In one embodiment, the sonic tool is used to excite and detect multiple borehole modes such as a monopole mode and a dipole mode. In one embodiment, the monopole mode can be excited both at low and high frequencies and with far and near (relative to the receiver array) monopole sources and the dipole mode can be excited at two orthogonal directions yielding cross-dipole excitation. FIGS. 1b and 1c show signals received by spaced receivers resulting from high and low frequency monopole source signals while FIGS. 1d and 1e show respectively the resulting x dipole and y dipole receiver signals. FIG. 1f is a slowness dispersion plot which reveals the presence of three borehole-guided "modes": (i) a Stoneley wave at a slowness of approximately 300 microseconds/ft, (ii) a flexural wave which has varying slownesses depending upon frequency, and (iii) a shear wave at a slowness of approximately 120 microseconds/ft. It will be appreciated that using a SONIC SCANNER tool or the equivalent thereof provides measurements that are rich in data as multiple borehole modes are excited and detected using a multiplicity of transmitters and individual recordings of receivers in an axial and azimuthal array.

In one aspect, while a sonic tool, such as the SONIC SCANNER, has previously been used for well integrity applications for a conventional CBL-VDL measurement to scan only the inner casing, the aforementioned borehole modes of the sonic tool have the capability of probing beyond the first casing and annulus, and therefore may have the capacity, if used as herein-described, to diagnose the material fill and bond condition of the annuli of a multiple casing configuration. In one aspect, the ability to diagnose the annuli of a multiple casing configuration is helped if the status of the inner casing bond and annulus are known or determined by another measurement such as a high resolution ultrasonic measurement made by a tool such as the ISOLATION SCANNER tool of Schlumberger Technology Corporation.

Figure 2A:
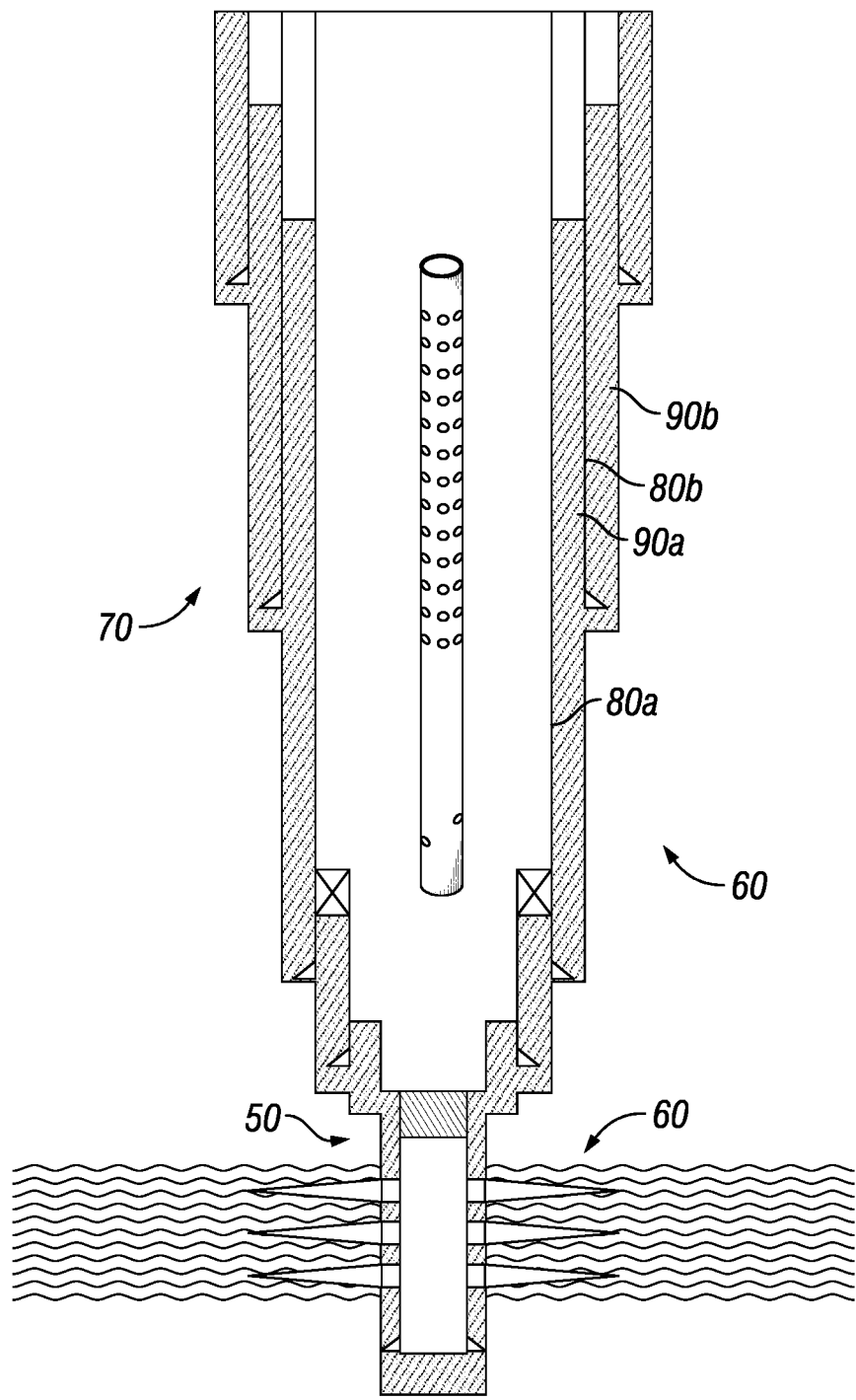
FIGS. 2a-2e are respectively a schematic of the sonic tool of FIG. 1a in a multiple casing string well (2a), and schematics of cross-sections through the well representing four different states of two different annuli (2b-2e).

Turning to FIG. 2a, the sonic tool 10 is shown located in a plugged-in well 50 traversing a formation 60. The well is shown to be cased with a multiple casing strings 70. For purposes of illustration, a particular segment of the well is shown to have a first casing 80a and a second casing 80b with first casing 80a surrounded by an annulus 90a and second casing 80b surrounded by an annulus 90b. For part of its length, annulus 90a is located between casing 80a and the formation 60, and for part of its length, annulus 90a is located between casing 80a and casing 80b. For part of its length, annulus 90b is located between casing 80b and the formation 60.

Figure 2B:
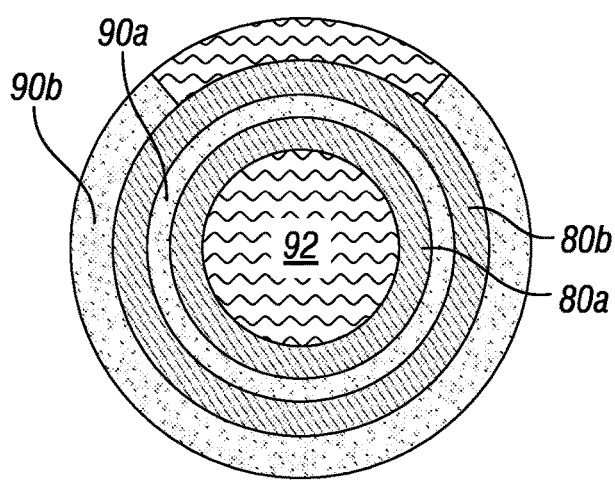
Figure 2C:
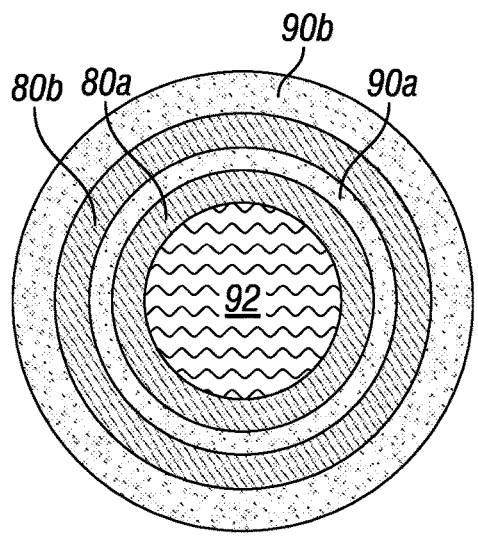
Figure 2D:
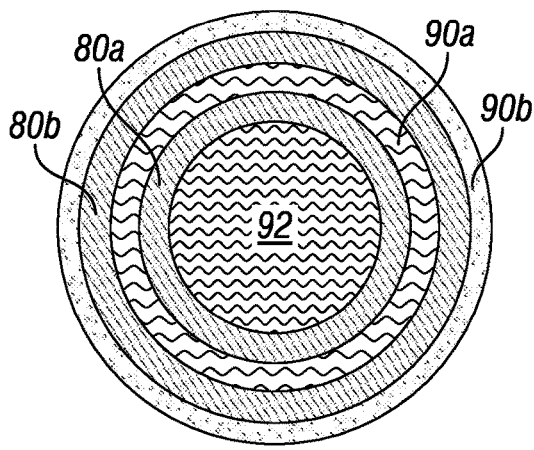
Figure 2E:
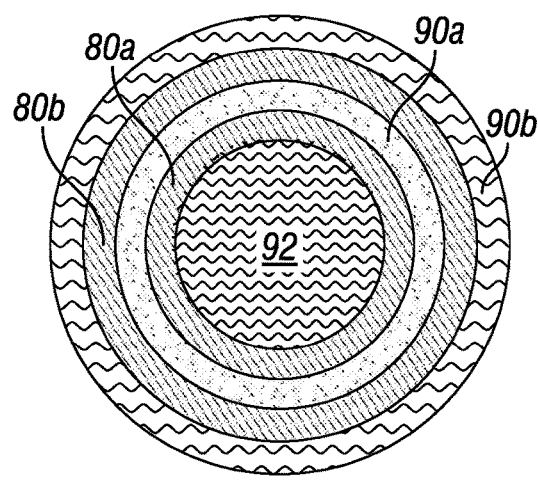

It will be appreciated that the annuli 90a, 90b seen in FIG. 2a may assume various states such as fully cemented, liquid filled, cemented only along part of the circumference, etc. Although other scenarios may be considered, in one embodiment the following scenarios are of particular interest: both annuli are cemented with a full bond; annulus 90a is liquid and annulus 90b is cemented; annulus 90a is cemented and annulus 90b is liquid; both annuli are liquid-filled; there is a barite sag in one or both annuli; and one or both annuli have a partial bond. FIGS. 2b-2e show some of these scenarios. For example, FIG. 2b shows an inner annulus 90a of cement, an outer annulus 90b partially of cement and partially of liquid. FIG. 2c shows both inner annulus 90a and outer annulus 90b fully cemented. FIG. 2d shows inner annulus 90a with liquid and outer annulus 90b fully cemented, while FIG. 2e shows the inner annulus 90a with cement and the outer annulus 90b with liquid. In all four figures, the inner casing (pipe) 80a is filled with mud 92.

In addition to the variables associated with the annuli, it should be appreciated that the formation acoustics, the pipe (casing) weight and size, and the mud characteristics are variables that may be dealt with in analyzing sonic data. For example, the acoustic properties of the formation are often distinguished by the speed of signals in the formation. Thus, formations are described as being super or very fast, fast, intermediate, and slow. The type of formation (slow versus fast) imposes constraints on the ranges of frequencies/slownesses in which to search for distinguishing features as described hereinafter. Thus, when generating possible scenarios of a formation for generating model dispersion curves (as described below with reference to FIG. 5), it will be appreciated that the number of variables and the number of values for those variables will dictate the number of scenarios considered.

Figure 3A:
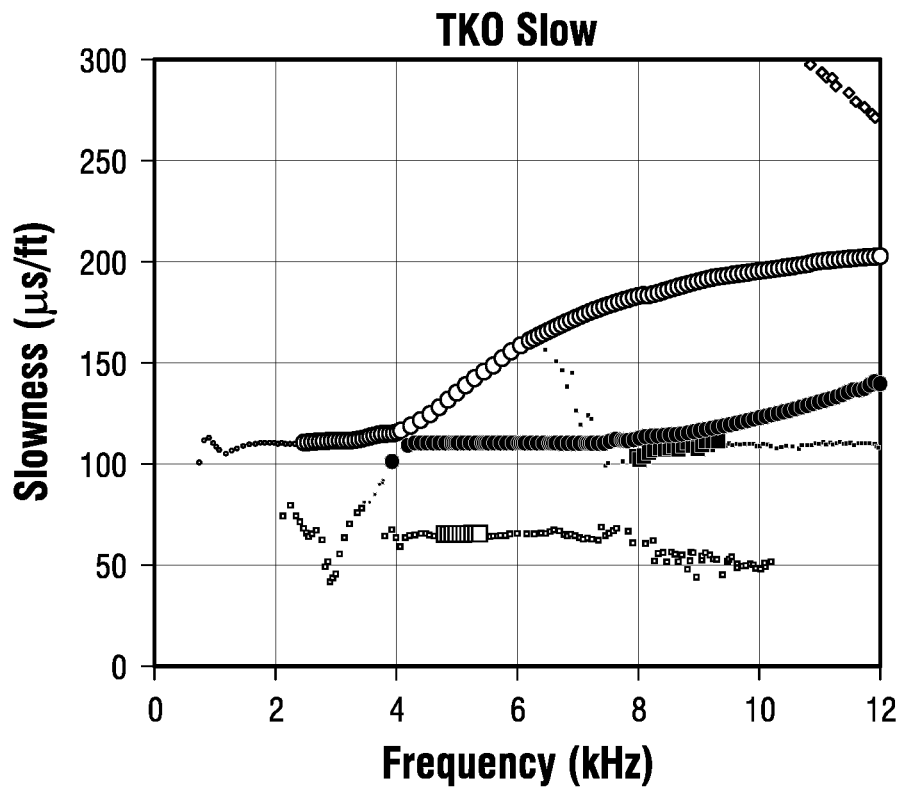
FIGS. 3a-3d are slowness dispersion plots (slowness versus frequency) for four different states of annuli in a multiple casing string well.
Figure 3B:
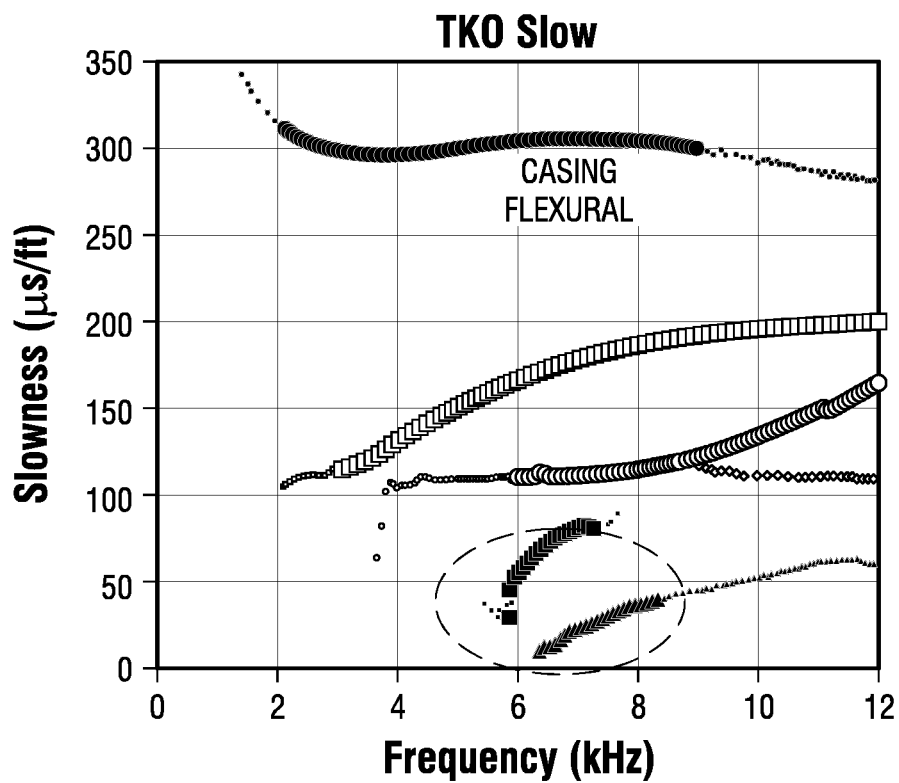
Figure 3C:
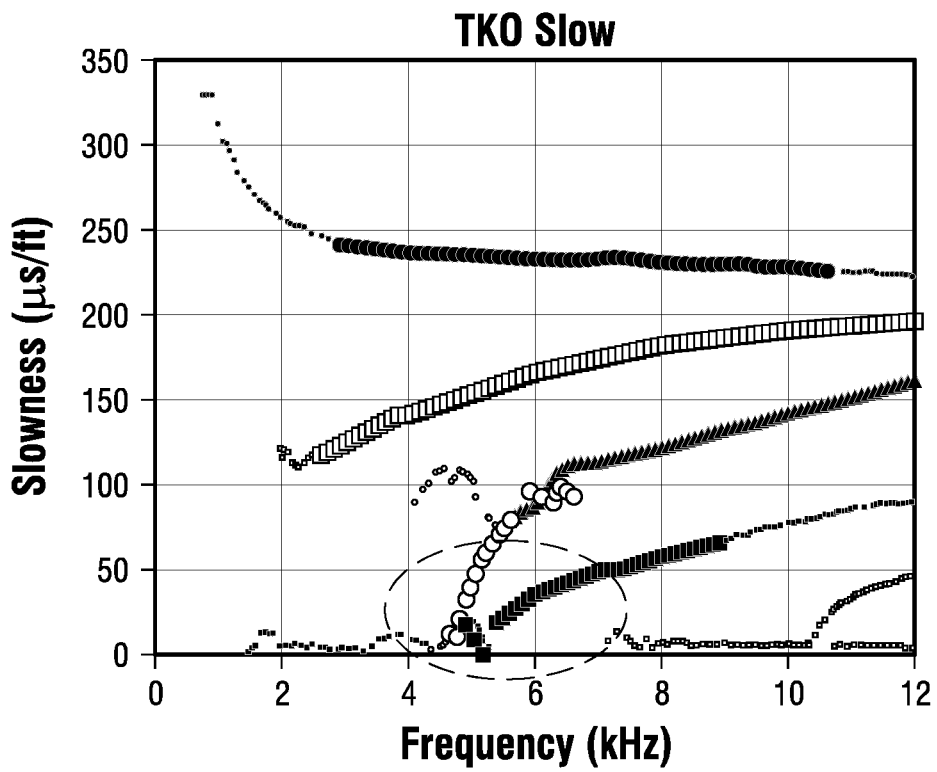
Figure 3D:
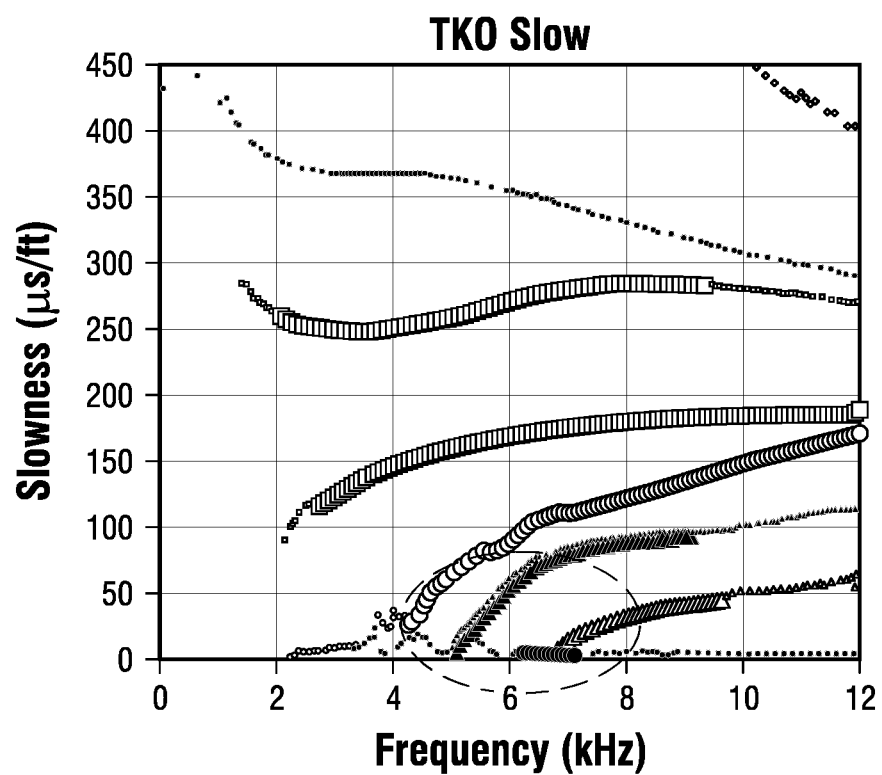

In one aspect, the variables relating to the annuli, formation, pipes and mud can impact the sonic signals detected by the detectors of tool 10. Turning to FIGS. 3a-3d, the processed signals from a dipole firing are seen for a fast formation (80 microseconds/ft) traversed by a well having two casings where the annuli around the casings have different states. In FIG. 3a, the processed signals are from a well where both casings are well cemented. In FIG. 3b, the processed signals are from a well where the the annulus surrounding the inner casing is liquid and the annulus surrounding the outer casing is cement. In FIG. 3c, the processed signals are from a well where the annulus surrounding the inner casing is cement and the annulus surrounding the outer casing is liquid. In FIG. 3d, the processed signals are from a well where the annuli surrounding both the inner and outer casing are liquid. In all cases, the detected signals (waveforms) were processed utilizing TKO processing, such as described in Lang, S., et al., "Estimating Slowness Dispersion from Arrays of Sonic Logging Waveforms," *Geophysics*, Vol. 52, no. 4, pp. 53-544, April 1987, and Ekstrom, M. P., "Dispersion Estimation from Borehole Acoustic Arrays Using a Modified Matrix Pencil Algorithm", *Proc. 29th Asilomar Conference on Signals, Systems and Computing*, Vol. 2, pp. 449-453, November 1995. In FIG. 3a, after TKO processing, first and second order dipole flexural signals are seen, without the clear indication of any other modes. In FIG. 3b, five modes are suggested, including a casing flexural mode at about 300 microseconds/ft, first and second order dipole flexural signals, and two cut-off mode signals. For purposes herein, a "cut-off" mode is a mode observed in a pipe that is surrounded by fluid where the phase slowness reaches or approaches zero at some frequency. Thus, in FIG. 3b, the two possible cut-off mode signals are circled for clarity and appear to have a cut-off frequency of approximately 6 kHz. In FIG. 3c, again five modes are suggested with two of the mode signals appearing to be cut-off mode signals. The two cut-off mode signals are circled and appear to have a cut-off frequency of between 4.5 and 5 kHz. Comparing FIGS. 3b and 3c, it should be appreciated that the cut-off mode signals are indicators of the presence of a free pipe, with the lower cut-off frequency of FIG. 3c indicative of the signal of a larger diameter pipe (the outer pipe) being free, and the higher cut-off frequency of FIG. 3b indicative of the signal of a smaller diameter pipe (the inner pipe) being free. In FIG. 3d, six modes are suggested with three possible cut-off mode signals circled. The three possible cut-off mode signals appear to have cut-off frequencies ranging from approximately 4 kHz to 7 kHz. Multiple cut-off frequencies are indicative of multiple free pipes.

Based on FIGS. 3a-3d, it will be appreciated that the variables associated with the annuli alone cause significant changes in the resulting slowness dispersion plots. It will be appreciated that the formation acoustics, the pipe (casing) weight and size, and the mud characteristics can also cause significant changes in the slowness dispersion plots. Thus, correct identification of the cut-off modes and the number of cut-off modes, the presence of formation modes, the number of casing flexural modes, etc., from the processed data can present challenges.

In one aspect, the attenuation dispersion (obtained for example by processing the signals according to TKO processing using a matrix pencil method) is also sensitive to the parameters of interest and may be used in identifying correct features from the dispersions. For example, true cut-off modes have significant attenuation since their phase slowness is typically faster than that of the formation. This is seen in FIGS. 4a-4c where the top graph in each figure provides TKO slowness plots with various modes and a particularly highlighted cut-off mode and the bottom graph for that figure shows the attenuation dispersion for that cut-off mode. Therefore, a comparison of the attenuation to a threshold can enable a reliable detection of the cut-off modes among potential aliasing artifacts in realistic scenarios.

In one embodiment, the identification and analysis of cut-off modes as a function of depth in a formation are used to obtain an indicator for the status of the casings in a multi-string cased hole. More particularly, and as discussed hereinafter with reference to FIG. 5, potential cut-off modes are identified for sets of possible scenarios of variables associated with one or more of the annuli, formation, casing, and mud. In addition, measured dispersion data for several feet of the well may be aggregated and overlayed in order to help identify modes.

Figure 5:
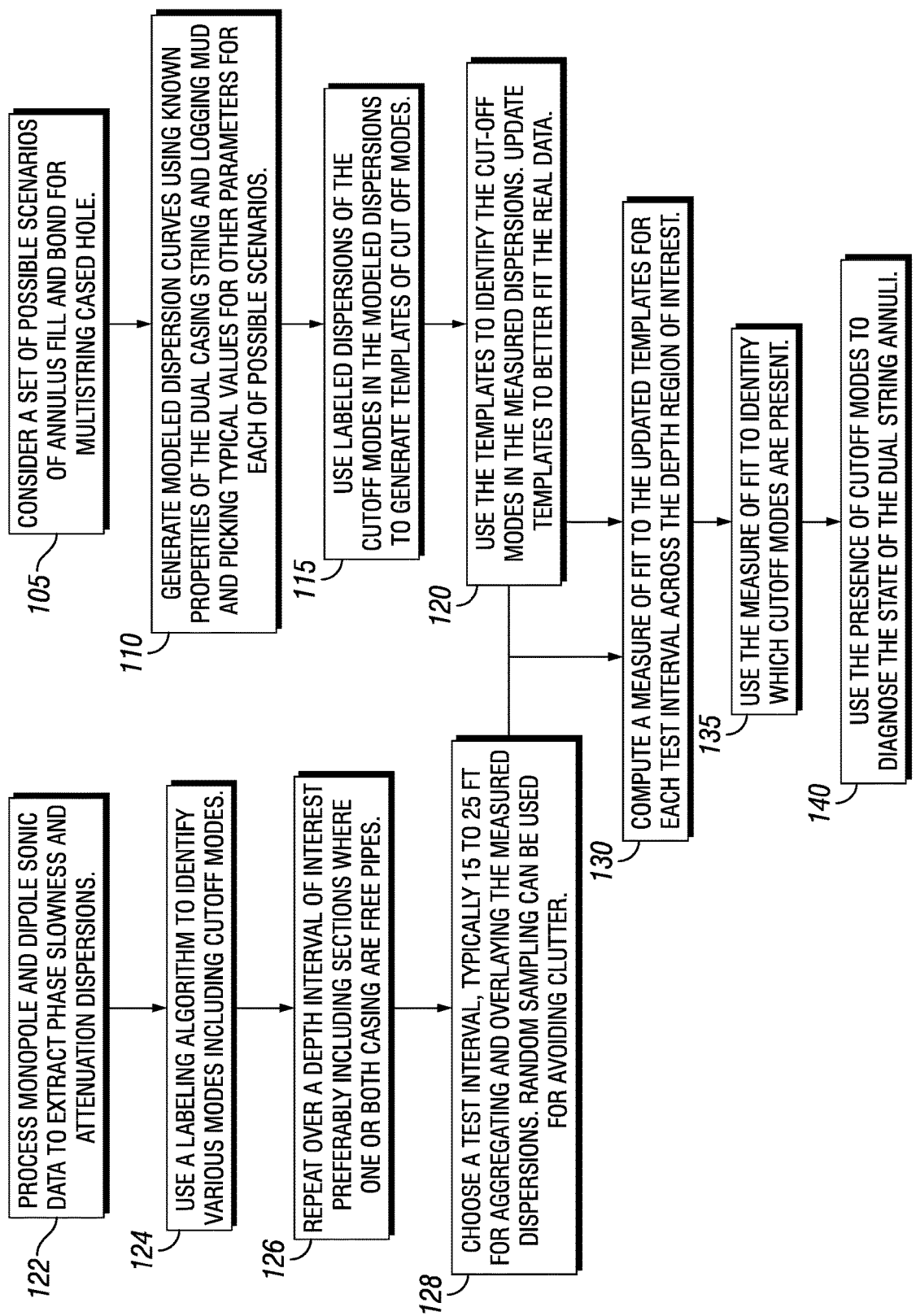
FIG. 5 is a flow-chart of a method of an embodiment that extracts dispersion cutoff modes from sonic data over a depth interval, overlays the data and then matches the overlayed data to templates from a model in order to diagnose the status of the annuli in the multistring casing.
Figure 6A:
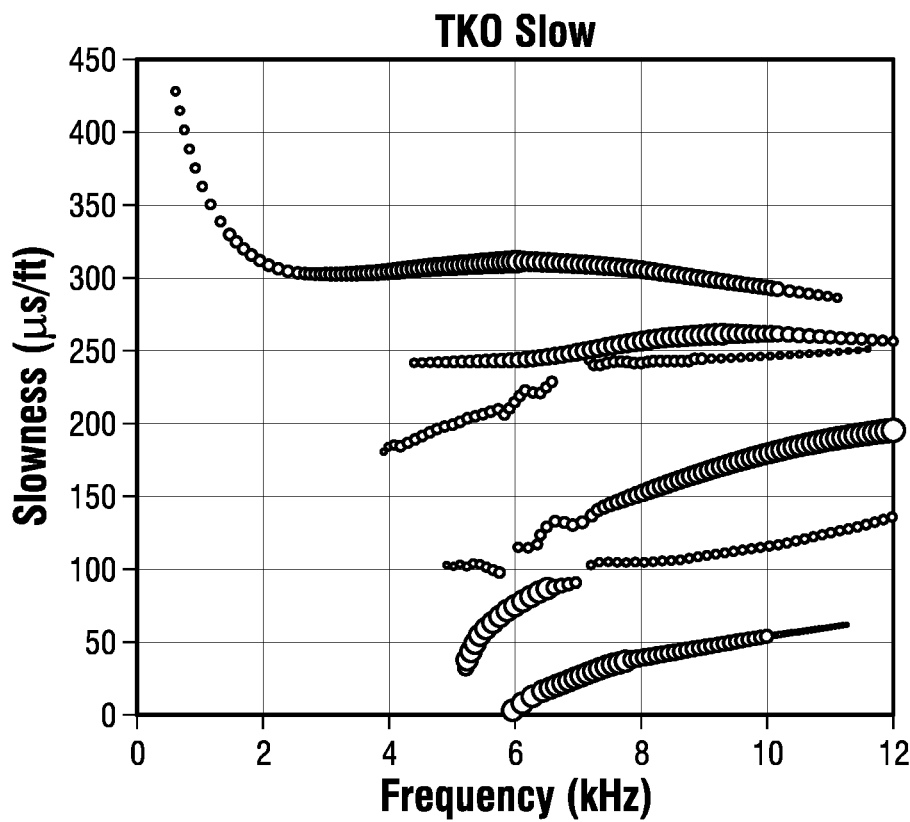
FIGS. 6a-6d are slowness dispersion plots (slowness versus frequency) with FIGS. 6a-6b representing the situation where the first annulus is liquid and FIGS. 6c-6d representing the situation where both the first and second annuli are liquid.
Figure 6B:
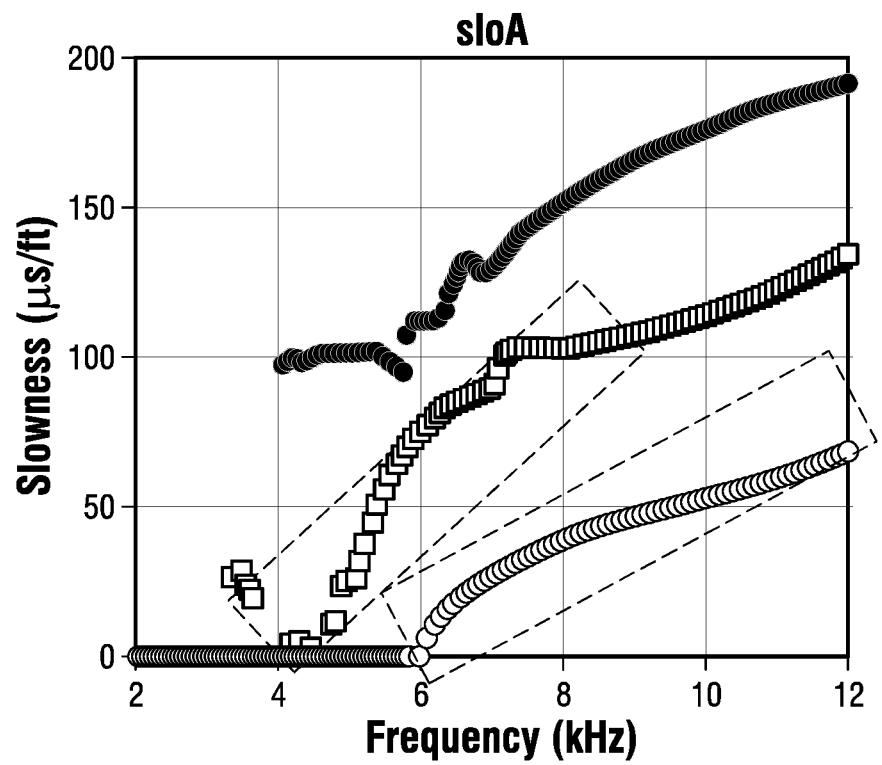
Figure 6C:
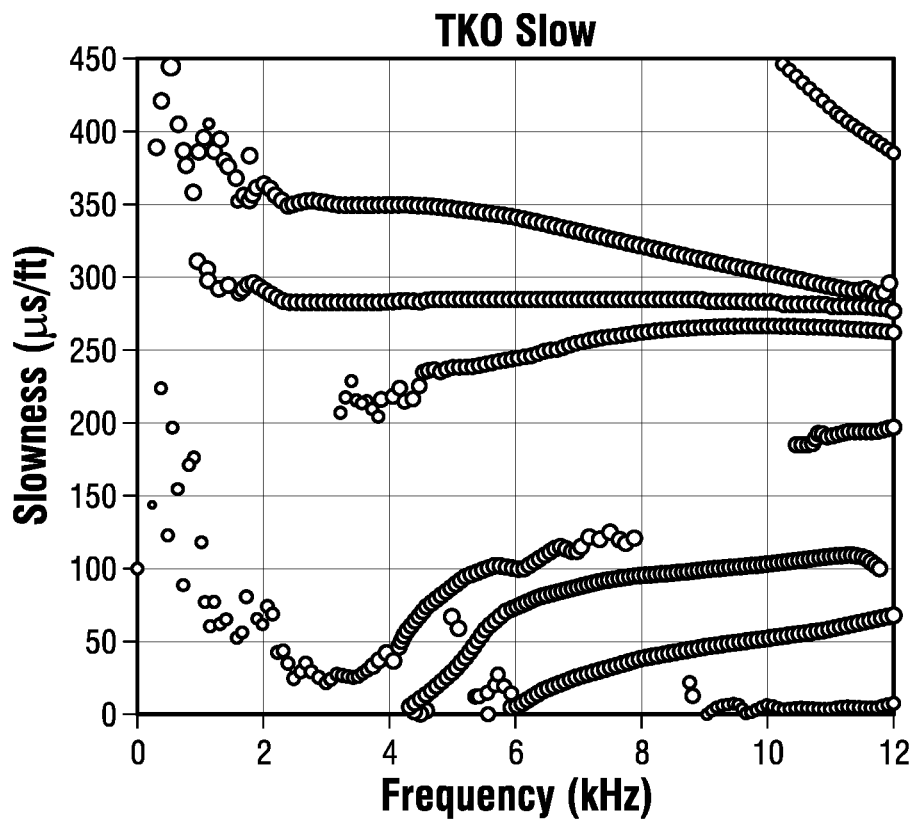
Figure 6D:
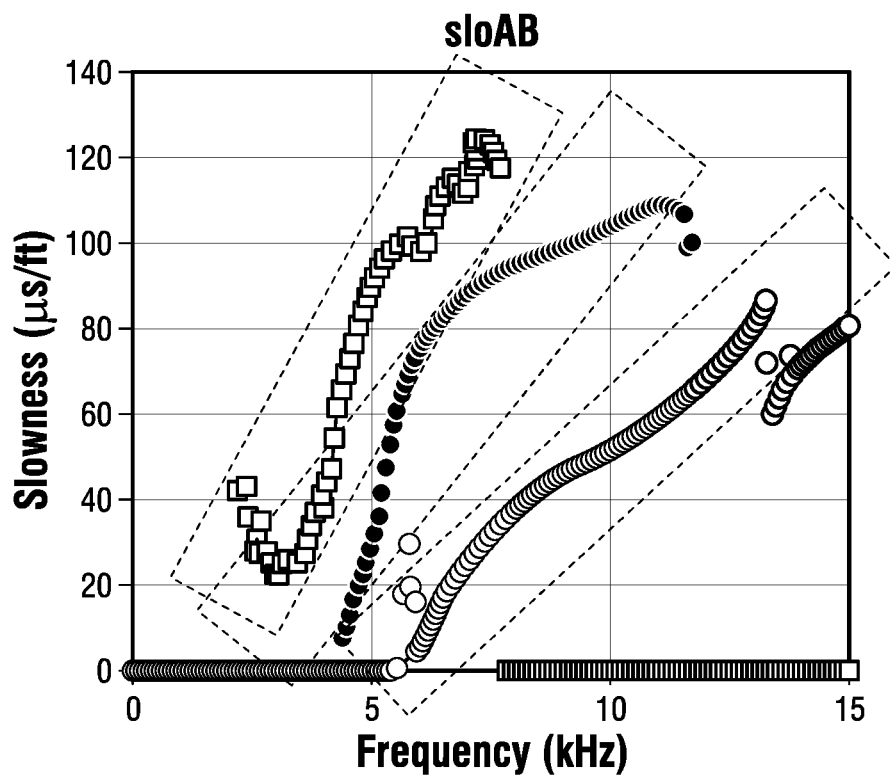

Turning to FIG. 5, the workflow of a method is seen for extracting dispersion cutoff modes from sonic data over a depth interval, overlaying and matching data to templates of a model, and using the match to diagnose the annuli of a multistring casing. More particularly, at 105, a set of possible scenarios regarding the variables are considered. For example, the status of the fill of annuli surrounding the casings and bond of cement to the casing and/or formation (i.e., the annuli variables) is considered. The formation slowness may also be considered, as may the pipe weight and size and the fluid weight (density) and wavespeed. At 110, model dispersion curves are generated for the set of scenarios (i.e., for the different combinations of variables). It is noted that if certain variables are known such as the pipe weight and size and mud weight, the scenarios may consider those variables as fixed values and sets of dispersion curves that vary those variables need not be generated. Thus, by way of example, the model dispersion curves might be generated that assume four different formation slownesses (e.g., acoustically slow, intermediate, fast and super-fast), two types of cement (e.g., hard cement such as class G with an acoustic impedance $Z_{cmt}$ typically larger than 4 MRayl, and light cement having an acoustic impedance typically less than 4 MRayl, and four annuli scenarios such as described with reference to FIGS. 2b-2e in order to generate thirty-two (four times two times four) scenarios and resulting model dispersion curve sets. Similarly, if certain information regarding formation slowness and/or annuli status is known, additional fixed values may be assigned in order to reduce the number of model dispersion curves generated. At 115, the model dispersion curves are analyzed in order to identify cut-off modes in each dispersion curve set and to generate templates of cut-off modes. The templates are then used at 120 to identify the cut-off modes in measured dispersions. The templates can be generated using modeling such as the modeling described in Yang Liu et al., "Acoustic Guided Waves in Cylindrical Solid-Fluid Structures: Modeling with a Sweeping Frequency Finite Element Method and Experimental Validation", AIP Conference Proceedings 1806, 030004 (2017), which is hereby incorporated by reference herein in its entirety. As described in the Liu et al. reference, a sweeping Frequency Finite Element Method (SFFEM) can be used to simulate acoustic waves in complex geometries, such as multi-string cased wells. The synthetic modal dispersion curves generated in the Liu et al. reference can be used as templates.

In one aspect, it should be appreciated that while templates may be generated using models for sets of possible scenarios of variables associated with one or more of the annuli, formation, casing, and mud, the templates may also be generated through the use of controlled experiments on artificial formations or on well-characterized field data.

The measured dispersion used at 120 are obtained by processing monopole and/or dipole sonic data from a sonic tool at 122 in order to extract phase slowness and, if desired, attenuation dispersions. A labeling algorithm may then be used at 124 to identify various modes including cutoff modes. The processing and labeling is repeated at 126 over a depth of interest in the well. The depth of interest will often include sections where one or both casings are free pipes. In one embodiment, at 128 a test interval is chosen and the dispersions along that test interval are aggregated and overlayed. By way of example only, the test interval can be between fifteen and twenty-five feet in length. In one embodiment, the dispersions of only random locations along the selected interval are used. In any event, in the embodiment where the dispersions of the test interval are aggregated and overlayed, the aggregated, overlayed dispersions obtained from the processing of data generated by a sonic tool are compared to the templates at 120 to identify the cut-off modes in the measured dispersions. In another embodiment, templates are matched to individual frames along the interval (without aggregating and overlaying the measured dispersions at 128).

If desired, the templates may be updated (refitted) to better fit the real data. Regardless, at 130, a measure of fit to the (updated) template is computed for each frame or for each test interval across the depth region of interest. The measure of fit may then be used at 135 to identify which cut-off modes are present in the data obtained at 122 by the sonic tool, and at 140, the cutoff modes are used to diagnose the state of the dual string annuli.

In one embodiment, template refitting is done using data of one depth interval where the measure of fit is high. As seen in FIG. 5, the aggregated dispersions of all other intervals as obtained at 128 are then compared at 130 to the updated templates.

The workflow of FIG. 5 may be further understood with reference to FIGS. 6-11b. In particular, a comprehensive analysis of modeled data was conducted for a dual casing scenario with a 7 inch casing inside a 9.675 inch casing where four formation slownesses and two types of cement, and led to the following conclusions. First, the results of the analysis reveal that there exist persistent cut-off modes at around 4.5 kHz and 6 kHz across all four scenarios of formation slowness indicating the presence of liquid in the annulus surrounding the inner casing, and an additional cut-off mode which appears in the situation where both annuli are liquid. This result is seen in FIGS. 6a-6d. In particular, in FIG. 6a, a TKO slowness dispersion plot is presented for a formation having intermediate acoustic slowness and light/slow cement in the annulus surrounding the outer casing (and liquid in the annulus surrounding the inner casing). Assessing the three modes with the lowest slownesses, it is seen in FIG. 6b that two of those modes appear to be cut-off modes which approach slownesses of zero at 6 kHz and 4.5 kHz respectively. In FIG. 6c, where a TKO slowness dispersion plot is presented for a formation having intermediate acoustic slowness and liquid in both annuli, more modes are presented. However, assessing the three modes with the lowest slownesses, it is seen in FIG. 6d that all three modes appear to be cut-off modes which approach slownesses of zero at 6 kHz, 4.5 kHz, and 4 kHz respectively.

Figure 7A:
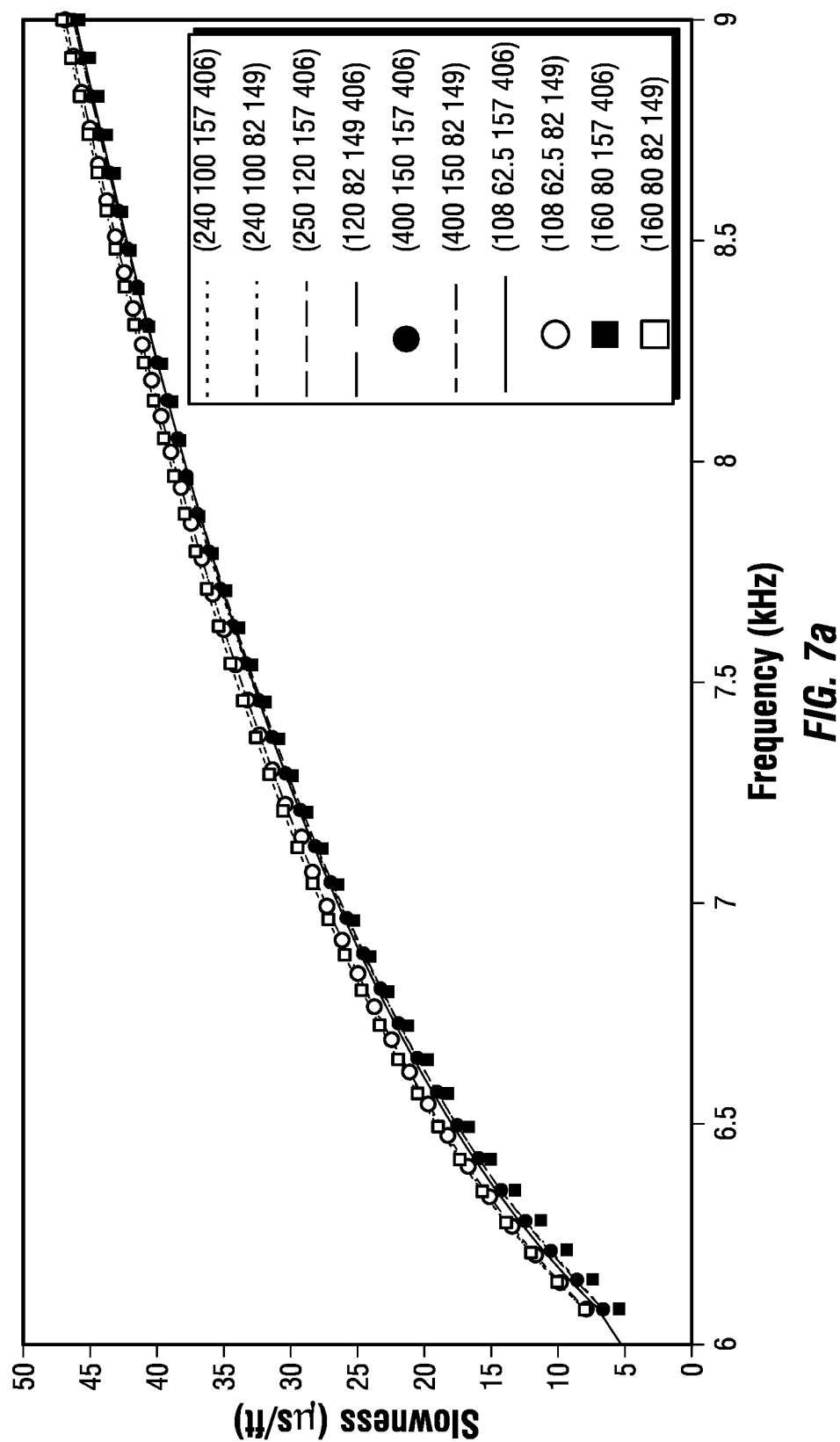
FIGS. 7a and 7b are slowness plots as a function of frequency at different formation shear and compressional slownesses and different cement and shear slownesses for a 6 kHz and a 4.5 kHz mode respectively, where the first annulus is liquid.
Figure 7B:
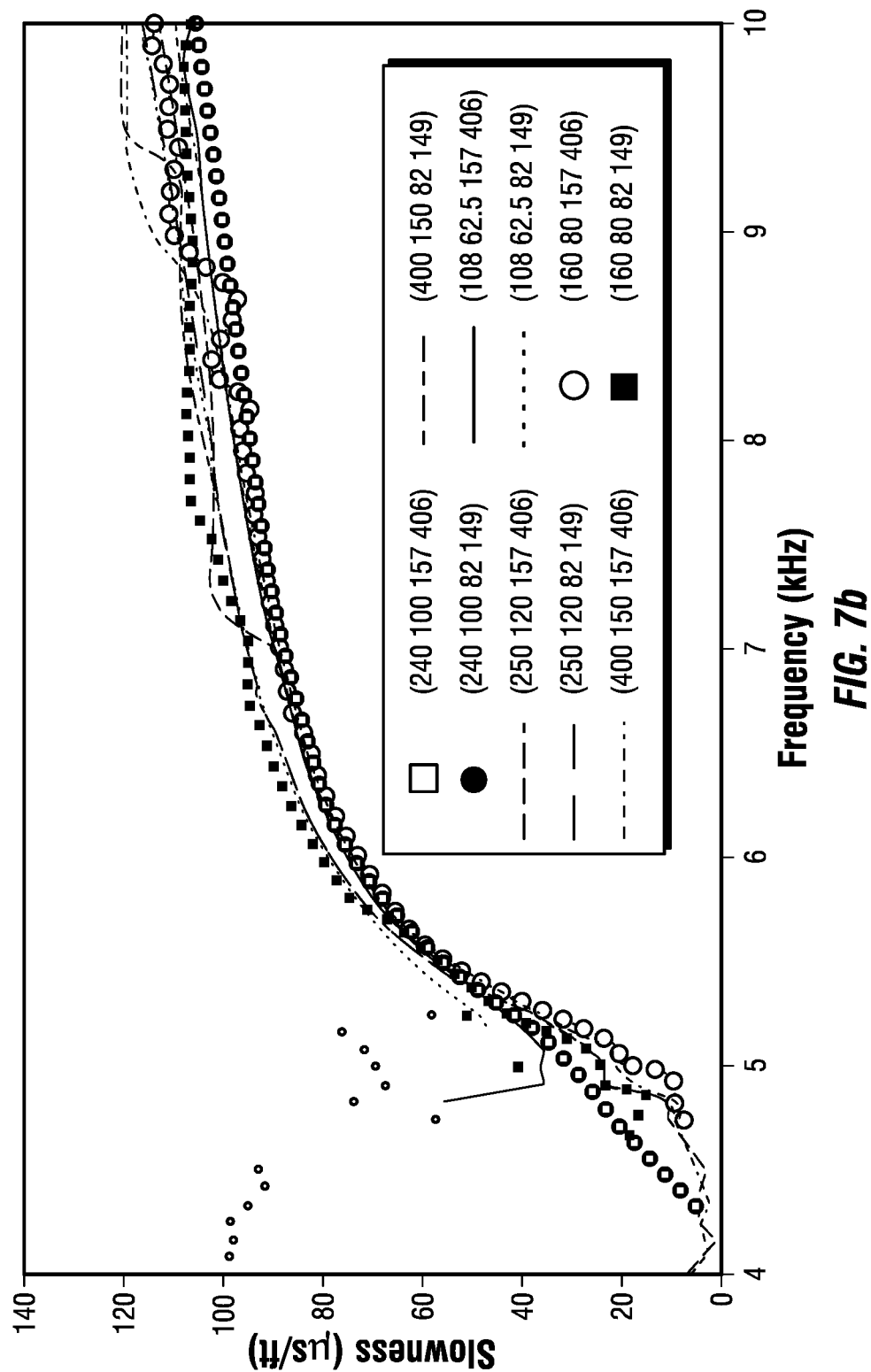
Figure 8A:
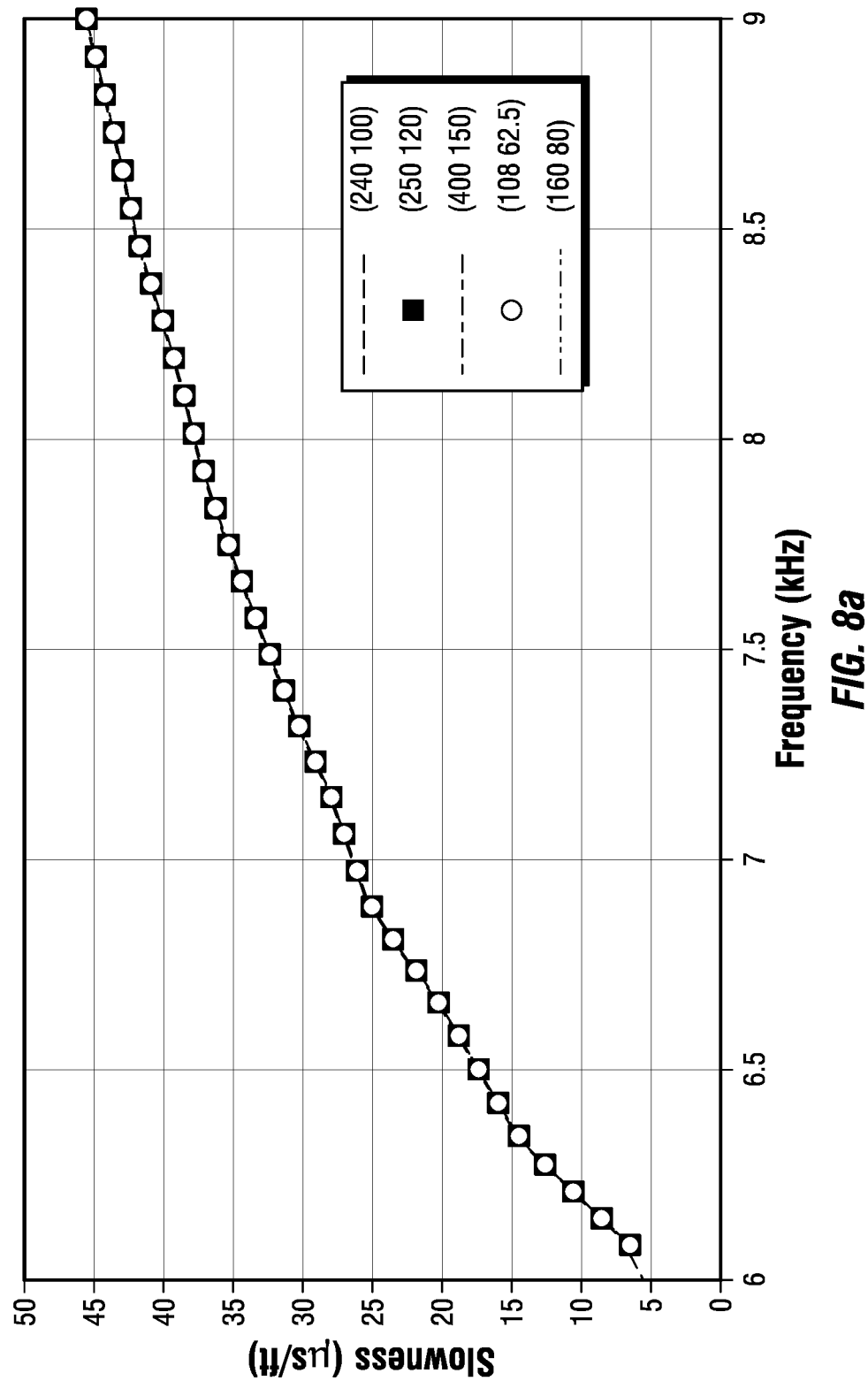
FIGS. 8a-8c are slowness plots as a function of frequency at different formation shear and compressional slownesses for a 6 kHz (8a), a 4.5 kHz (8b), and a 4.0 kHz (8c) cut-off mode respectively, where the first and second annuli are filled with liquid.
Figure 8B:
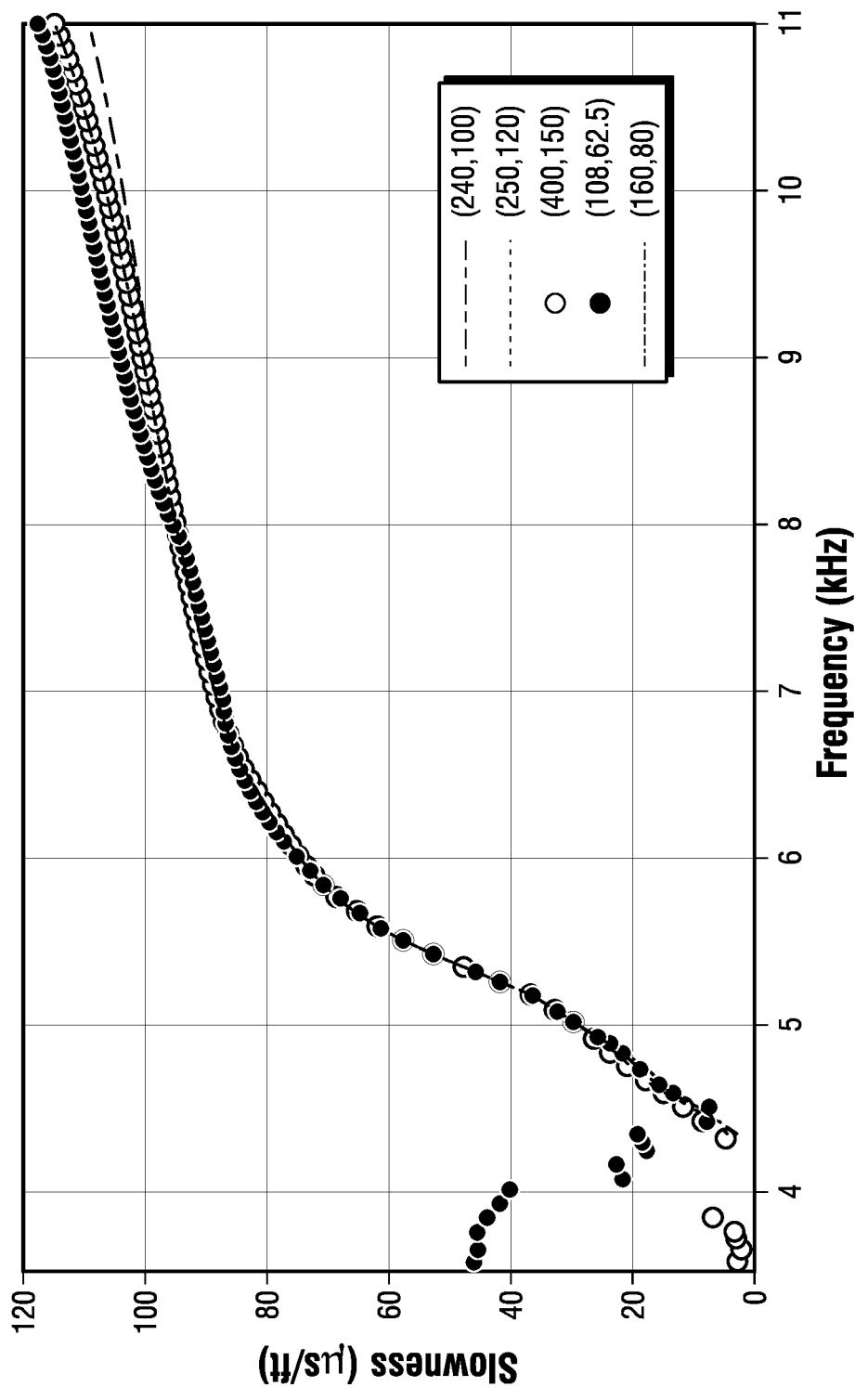
Figure 8C:
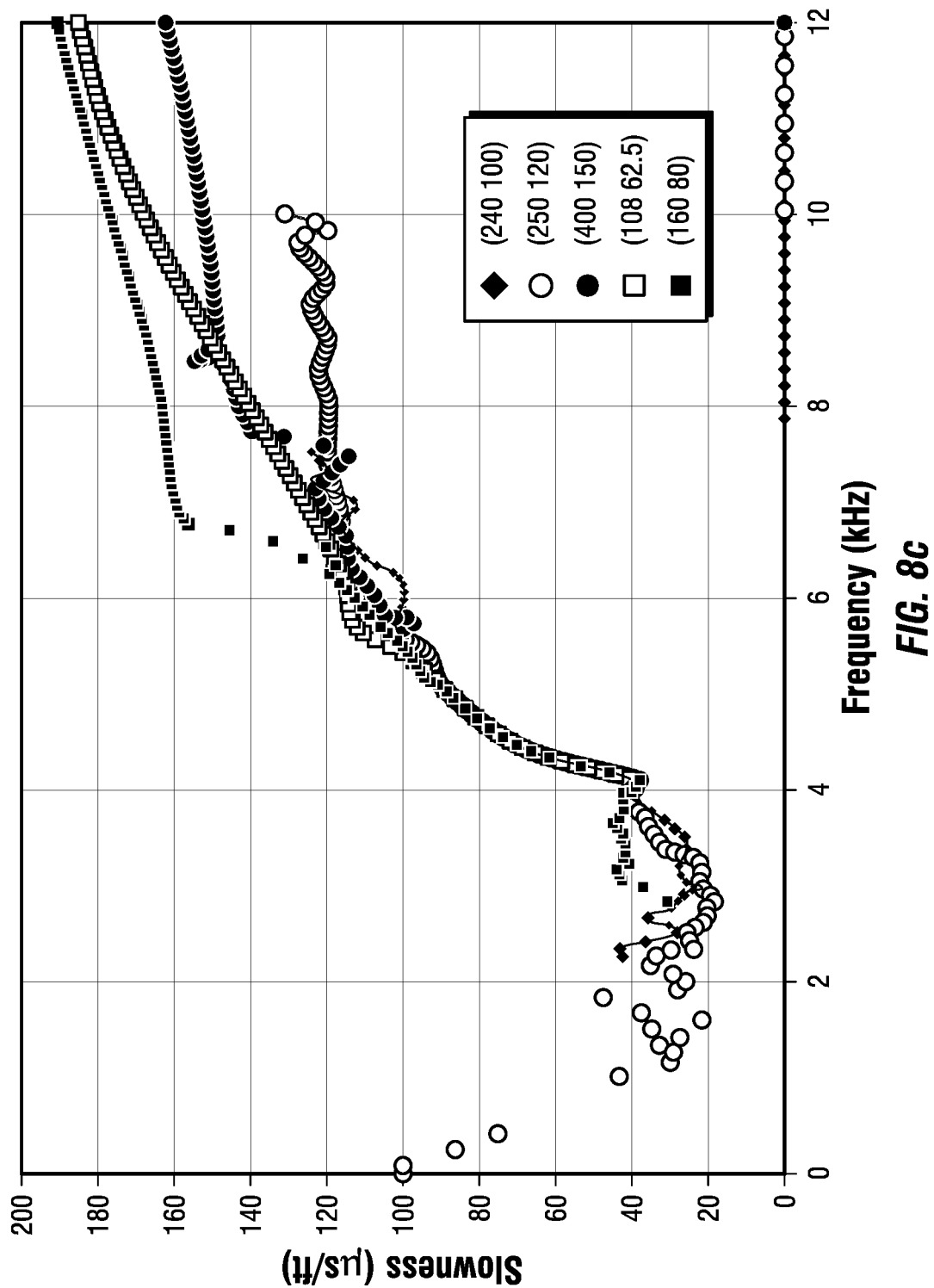

Second, the location and shape of the cut-off modes in the case where the annulus around the inner casing is liquid depends neither on formation type nor cement type. This is seen in FIGS. 7a and 7b where the results of the 6 kHz and 4.5 kHz cut-off modes respectively are plotted for multiple formation shear and compressional slowness and cement compressional and shear slownesses. In particular, in FIGS. 7a and 7b, the four numbers in the brackets of the key show varying formation shear and compressional slownesses and cement compressional and shear slownesses, yet the shapes and terminations of the slowness plots for each cut-off mode are quite uniform.

Third, a similar result is seen for the shape and location of the cut-off modes in the case where both annuli are liquid. Thus, in FIGS. 8a-8c cut-off modes at 6 kHz, 4.5 kHz and 4 kHz are respectively plotted for the various formation shear and compressional slownesses. Again, the shapes and terminations of the slowness plots for each cut-off mode are quite uniform.

Fourth, the borehole fluid and the type of fluid in the annuli affects the cut-off modes, but the effect of the fluid can be accounted for with a corresponding model.

Of course, FIGS. 7a, 7b, and 8a-8c are examples only, and it will be appreciated that the frequency locations of the cut-off modes may change when the casing sizes and weights change or when the mud properties change.

Based on FIGS. 7a, 7b, and 8a-8c, it will be appreciated that templates of the cut-off modes can be generated for multiple variable combinations (scenarios presented at 105 of FIG. 5). The generated templates (at 115 of FIG. 5) may be templates for single cut-off modes, or templates of multiple cut-off modes as desired.

To successfully extract these persistent cut-off modes from the slowness dispersion data, template matching to the measured data is conducted. In one embodiment, template matching uses the templates derived from the analysis of persistent cut-off modes from the modeling and overlays it to the measured data as at 120 of FIG. 5. As previously indicated, the templates can be overlaid onto individual frames of measured data or onto aggregated data (which may be sub sampled) in a depth range.

Figure 9A:
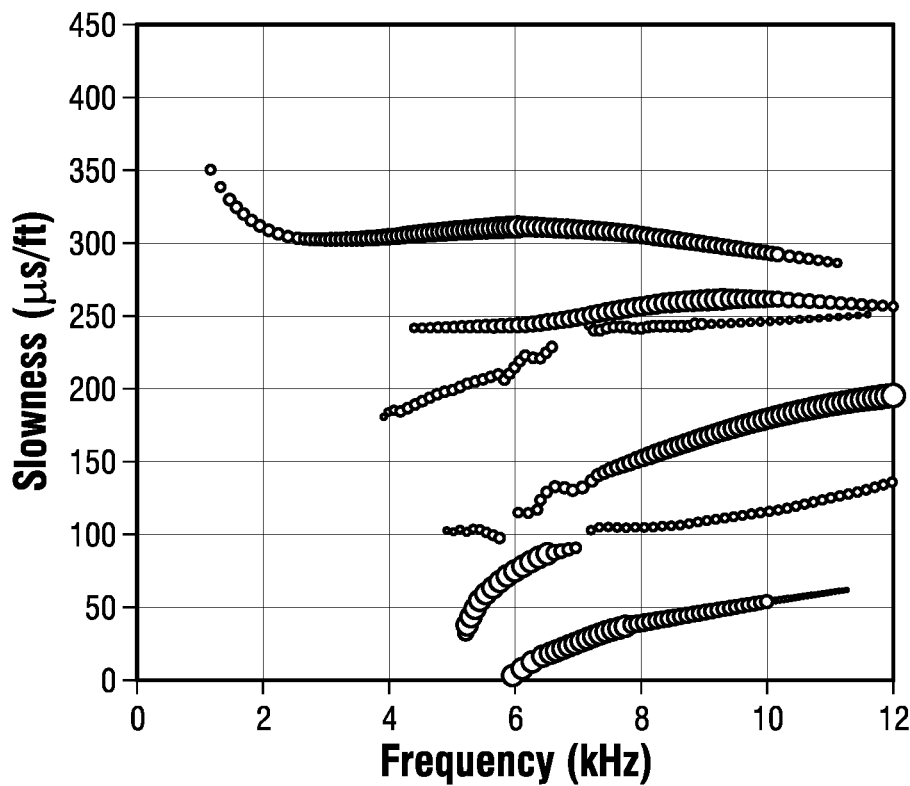
FIGS. 9a-9e are respectively a slowness dispersion plot (slowness versus frequency) of all detected modes of a concentric double string with liquid in a first annulus (9a), a slowness dispersion 5 kHz template (slowness versus frequency) (9b), a slowness dispersion plot (slowness versus frequency) of candidate modes of FIG. 9a with the template of FIG. 9b overlaid thereon (9c), and slowness dispersion plots (slowness versus frequency) of the individual candidate modes of FIG. 9a with the template of FIG. 9b overlaid thereon and showing the presence or lack thereof of a match (9d, 9e).
Figure 9B:
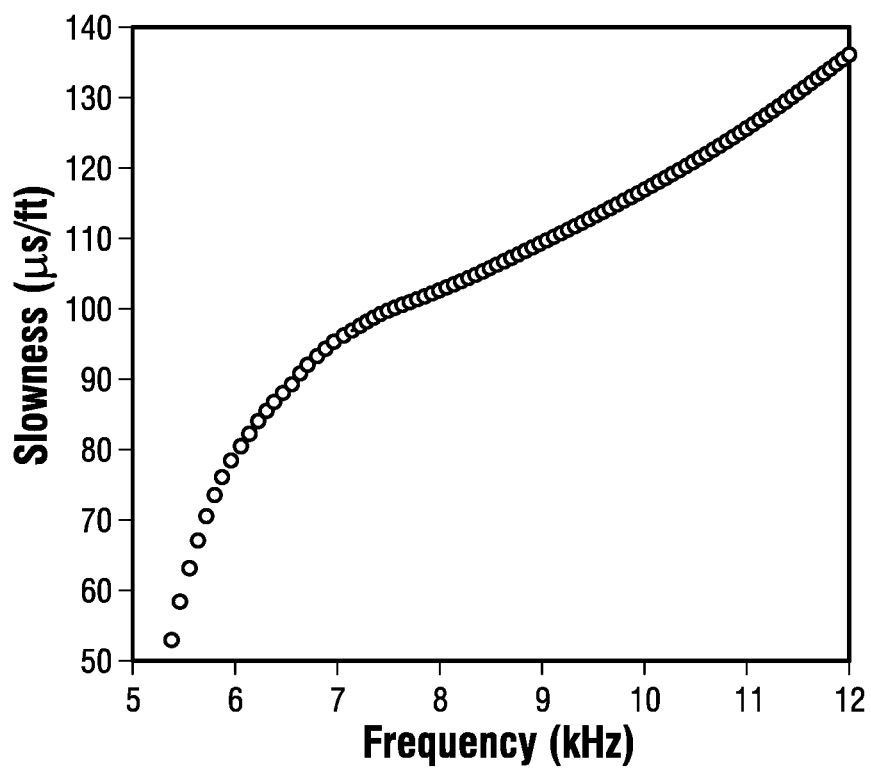
Figure 9C:
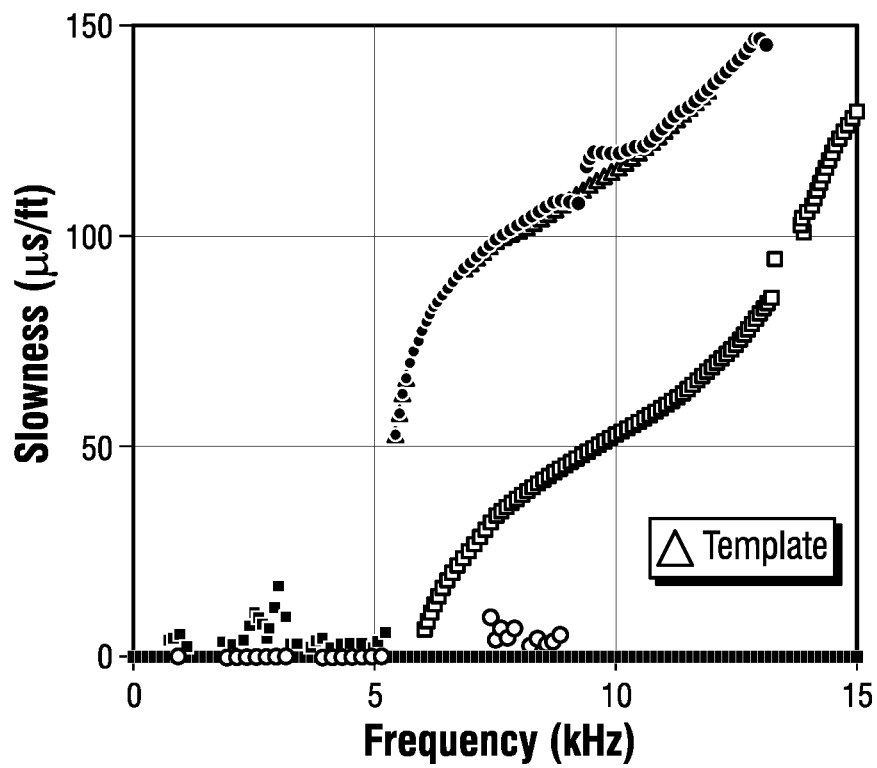
Figure 9D:
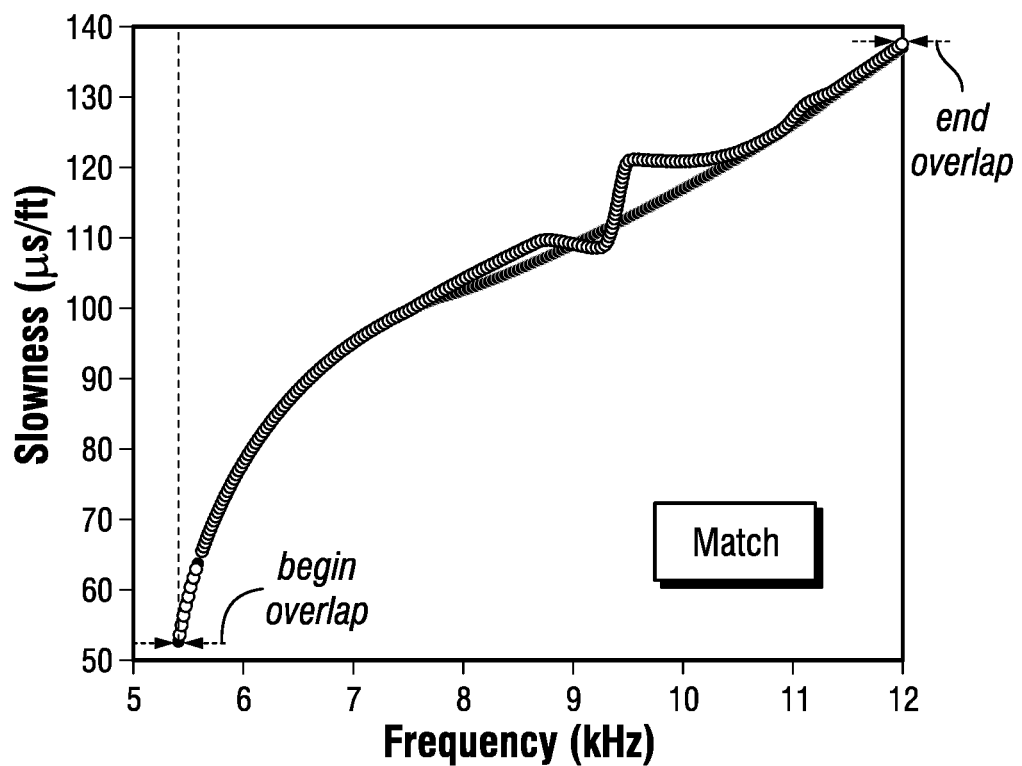
Figure 9E:
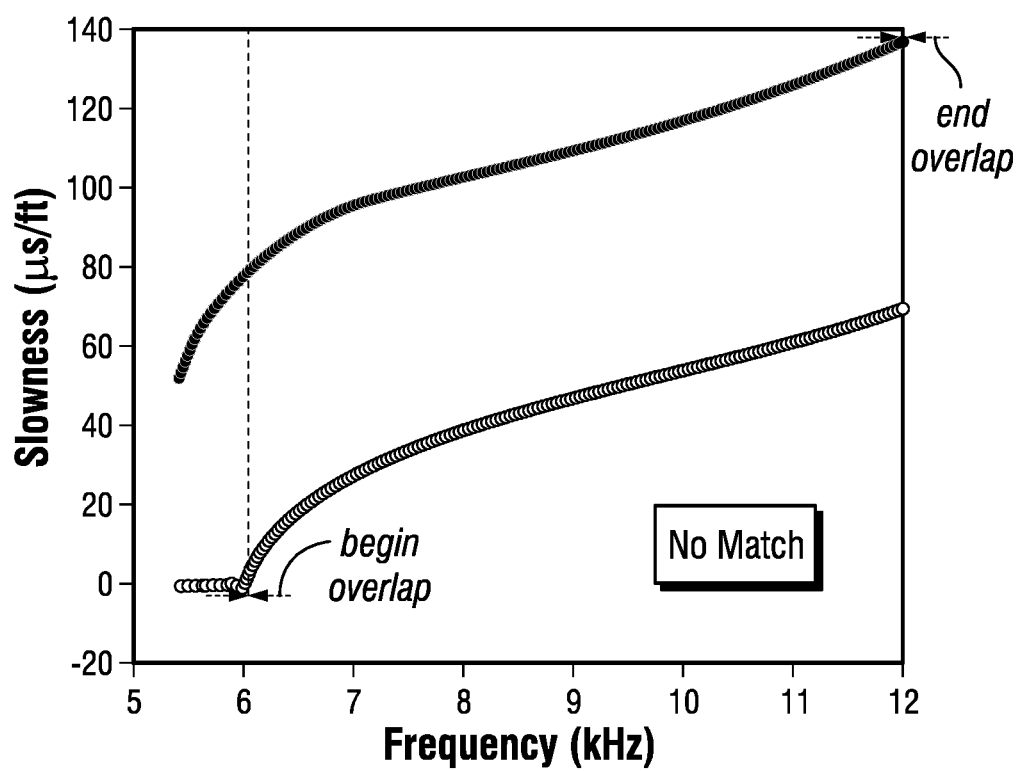

The matching of templates to individual frames of measured data is seen with reference to FIGS. 9a-9e. In FIG. 9a a slowness dispersion plot of all detected modes of a concentric double string with liquid in a first annulus is generated as at 122 of FIG. 5. Then, the slowness range in which the cut-off modes are anticipated is selected as at 124 of FIG. 5. In particular, only modes that extend substantially below 100 microseconds/ft are labeled as possible cut-off modes, although they potentially may be other leaky modes or artifact modes as opposed to cut-off modes. Then, cut-off mode templates such as generated at steps 105, 110, and 115 of FIG. 5 are compared against each possible cut-off mode. Thus, for example, FIG. 9b represents a template of a slowness dispersion plot for a 5 kHz cut-off mode for a formation of intermediate slowness. The 5 kHz model cut-off slowness dispersion plot of FIG. 9b is shown overlaid on the candidate cut-off modes of the data in FIG. 9c, and is shown overlaid on the candidate cut-off modes individually in FIGS. 9d and 9e. As seen in FIG. 9d (and in FIG. 9c), there is a match between one of the possible cut-off modes obtained from processing the data and the model 5 kHz cut-off slowness dispersion plot, whereas in FIG. 9e, there is no match between the model 5 kHz cut-off slowness dispersion plot and the other potential cut-off mode obtained from processing the data. It will be appreciated that other model cut-off slowness dispersion plots (e.g., representing a 6 kHz cut-off mode slowness dispersion plot, a 4.5 kHz cut-off mode slowness dispersion plot, etc.) may be used to try to match the other potential cut-off modes obtained from processing the data. It will also be appreciated that the matching or overlay of various templates to the identified possible cut-off modes obtained from processing the data may be done individually or together at one time.

According to one aspect, diagnosis at each individual depth (e.g., frame by frame) may not provide a desired confidence of results due to the potential sparsity in the observed modes in individual frames. Thus, in one aspect, in order to arrive at a more robust characterization of the status of the wellbore, it may be desirable to process and interpret the acoustic data in the context of depth. In one embodiment, this is accomplished via aggregation of the data over a depth interval as suggested at 128 of FIG. 5. Thus, in one embodiment, depth intervals of e.g., fifteen to twenty-five feet of data are aggregated and the templates are overlaid onto the aggregate data plot. In order to avoid clutter in selected intervals or subintervals, data can be subsampled, randomly or otherwise.

In one embodiment, in order to identify which cut-off modes are present in the data, a measure of fit as at 130 of FIG. 5 is defined as follows. First, a confidence interval is drawn around the designed cut-off template (by way of example only, slownesses of plus or minus 20% around the template, or a statistical confidence interval). Then for each frequency in a confidence band, the number of depth instances of extracted dispersions within the confidence band are counted. The count in the bands is then divided by the total number of frequency points considered in the band. The obtained score is between zero and one, with a score of one indicating a perfect correspondence between the aggregate and the template and a score of zero indicating a complete mismatch. A threshold value, e.g., 0.7, is selected (although other values may be utilized) as indicative of a desirable level of fit to indicate the presence of a cut-off mode as at 135 of FIG. 5, and the particular cut-off modes that are present are used to diagnose the state of the annuli of the wellbore as at 140 of FIG. 5.

Figure 10A:
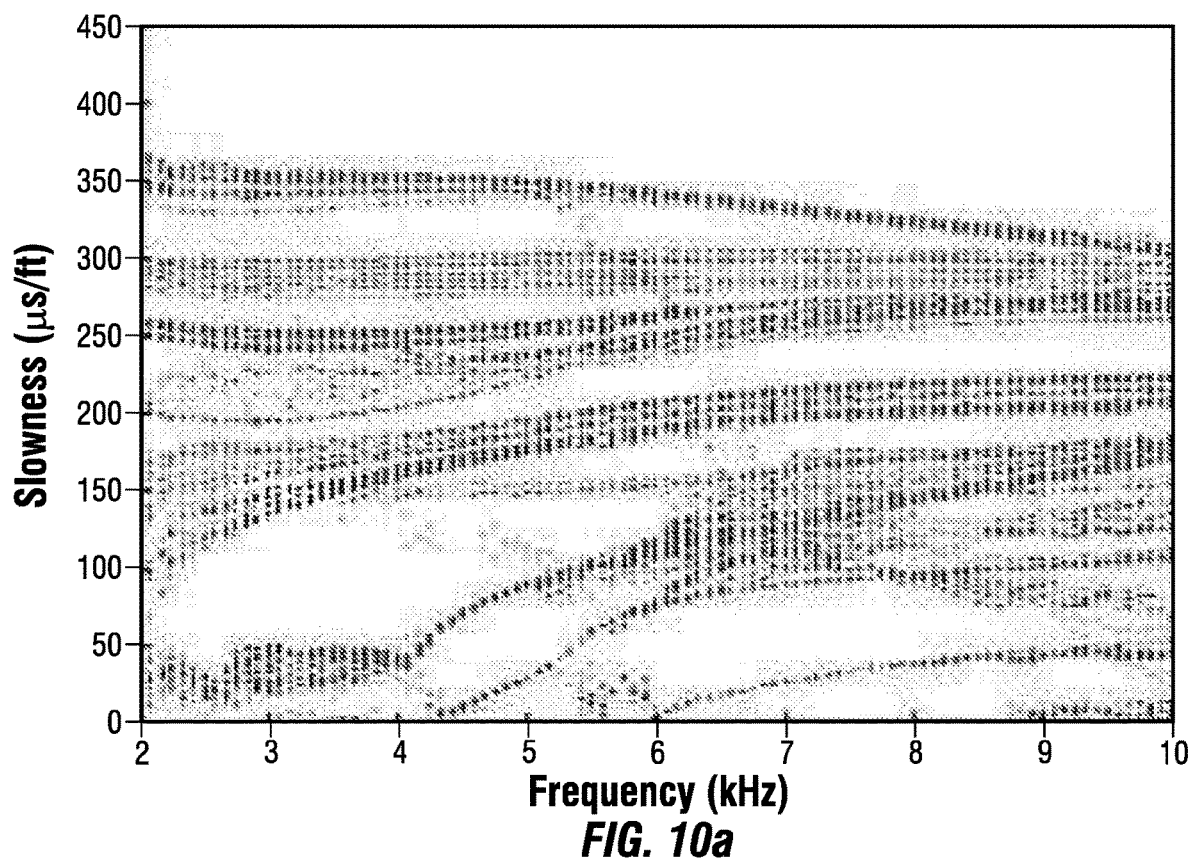
FIGS. 10a-10d are respectively a slowness dispersion plot (slowness versus frequency) having stacked data from multiple frames for a wellbore having liquid in both annuli (10a), the same plot with cut-off mode templates overlaid (10a), a refitting of the cut-off templates to the data (10c), and an overlay of the cut-off mode data with the refitted templates (10d).
Figure 10B:
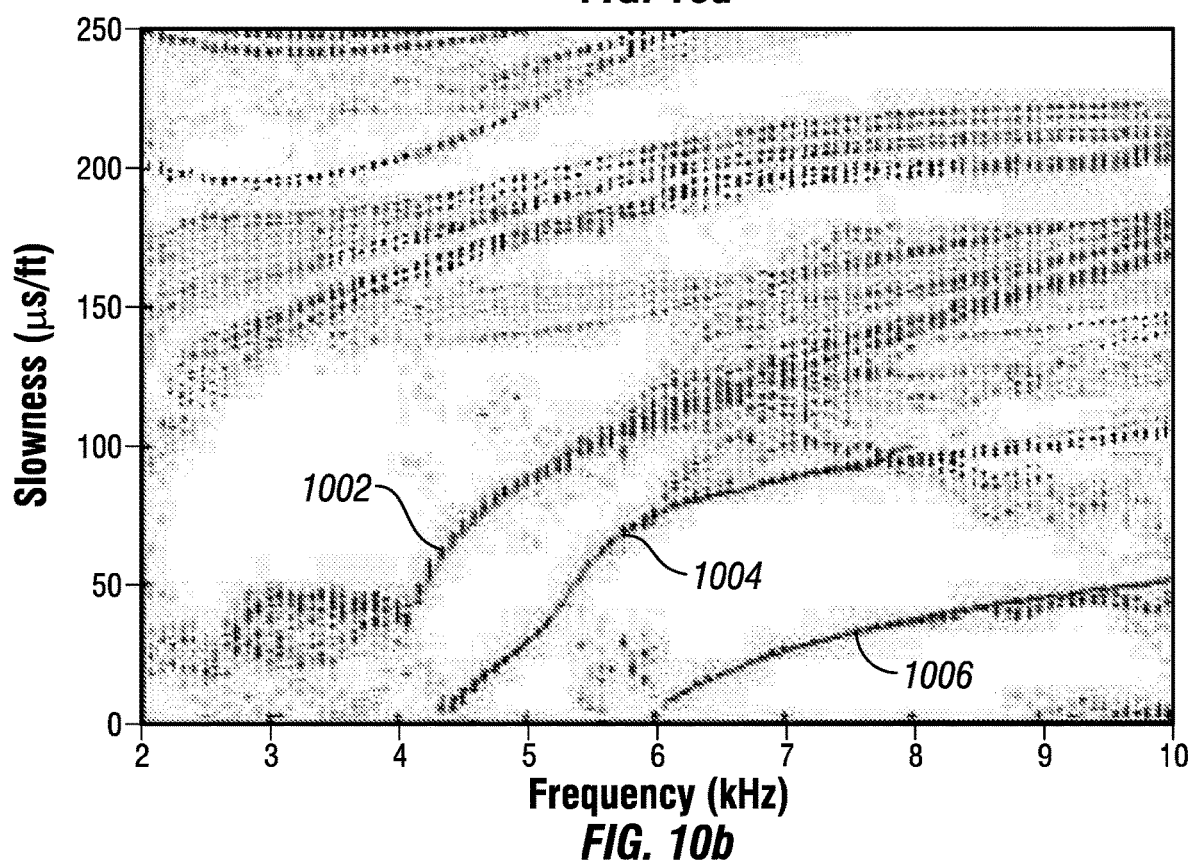
Figure 10C:
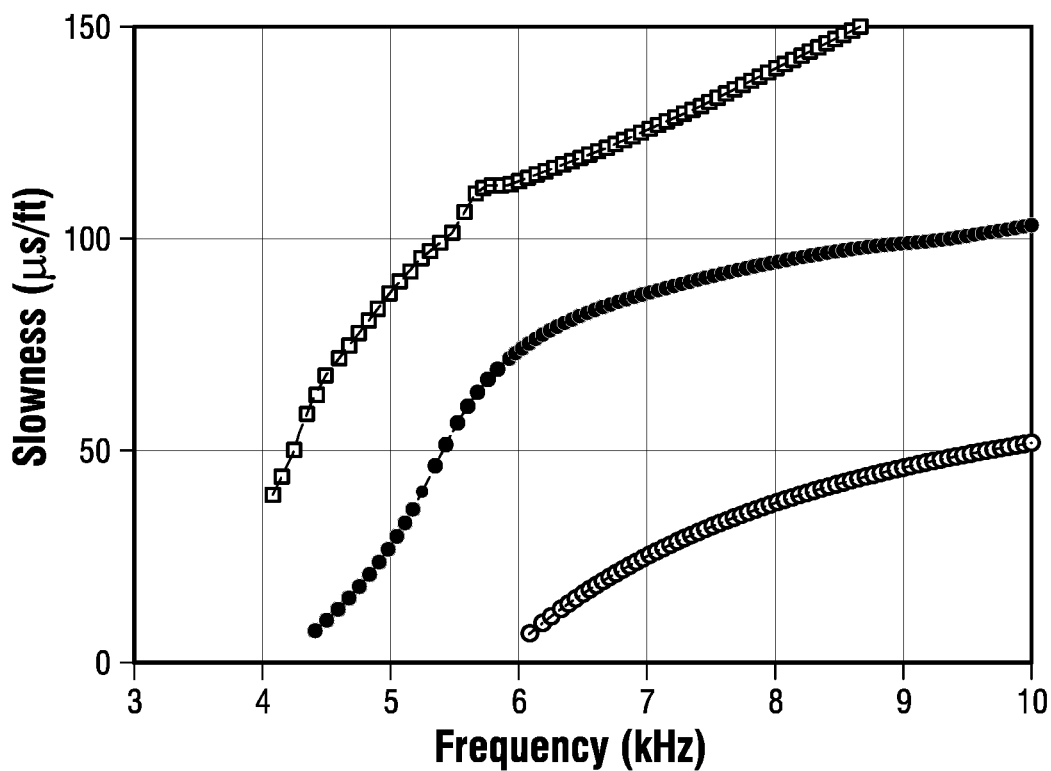
Figure 10D:
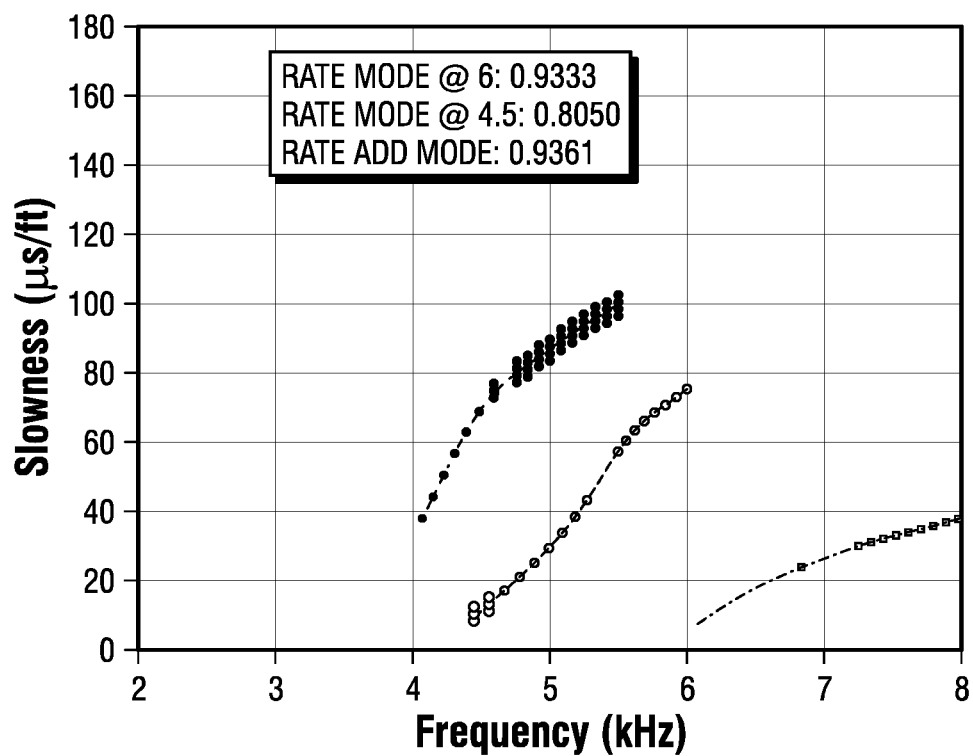

FIGS. 10a and 10b illustrate a synthetic dataset obtained from a sonic tool over a distance in a wellbore. Thus, in FIGS. 10a and 10b, fifty slowness plots subsampled from 425 frames over a depth in the wellbore are aggregated (stacked). In FIG. 10b, existing templates representing three cut-off modes (1002, 1004, 1006) are overlaid on the data showing that three cut-off modes appear to be present in the data. In FIG. 10c, updating of the templates is shown by refitting the templates to the data in a section where both pipes are clearly free. As an example, a least squares technique could be used to fit to the median average of the overlaid dispersions. This is similar to a free pipe calibration step used in cement evaluation. Then, in FIG. 10d, the data are compared to the refitted templates of FIG. 10c. As seen in FIG. 10d, the fit of the 6 kHz mode is 0.9333 (thereby indicating that the percentage of points in the confidence interval around the refitted 6 kHz mode is 93.33%), while the fits of the data with the 4.5 kHz and 4 kHz templates are 0.8050 and 0.9361 respectively.

Figure 11A:
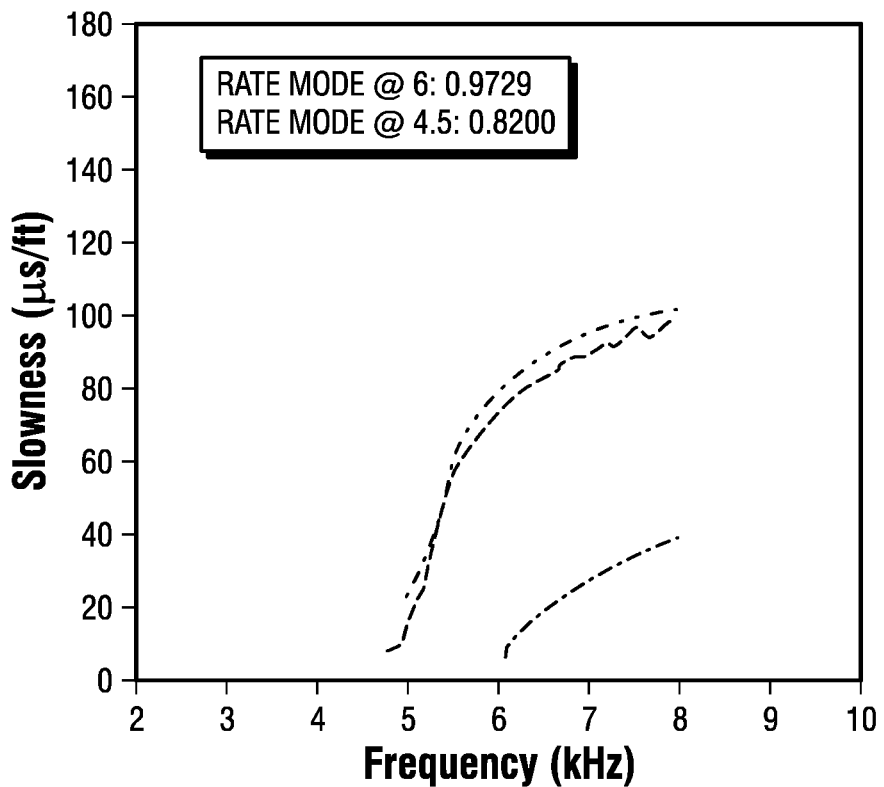
FIGS. 11a and 11b are respectively a slowness versus frequency plot of cut-off mode data overlaid with templates for a dual string casing with liquid in the annulus surrounding an inner casing and bonded cement in the annulus surrounding the outer casing, and a slowness versus frequency plot showing refitting of the templates.

Turning to FIG. 11a, a match between templates and processed data is seen. In FIG. 11a, the data represents stacked (aggregated) data of proposed cut-off modes isolated from other dispersion data which were obtained from the processing of sonic data of a sonic tool. The templates that are overlaid on the data represent 6 kHz and 4.8 kHz cut-off modes derived from modeling of a dual string casing having a liquid annulus around the inner casing and bonded cement around the outer casing. As is seen in FIG. 11a, the match between the 6 kHz cut-off mode template and the data is 0.9729 and the match between the 4.8 kHz cut-off mode template and the data is 0.82.

Figure 11B:
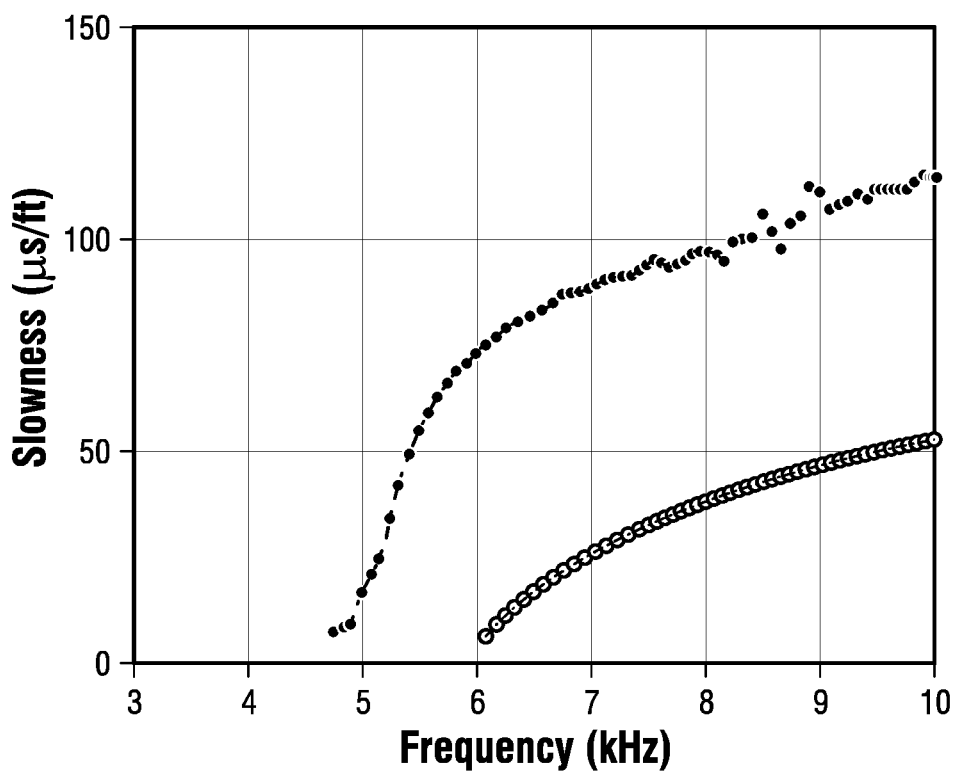

In FIG. 11b, template refitting is conducted using a least squares fit algorithm. As previously suggested, the refitting is optionally conducted using data of one depth interval where the measure of fit is high so that at other locations along the wellbore, when the refitted templates when overlayed on the data, the results are likely to be more accurate.

Figure 12:
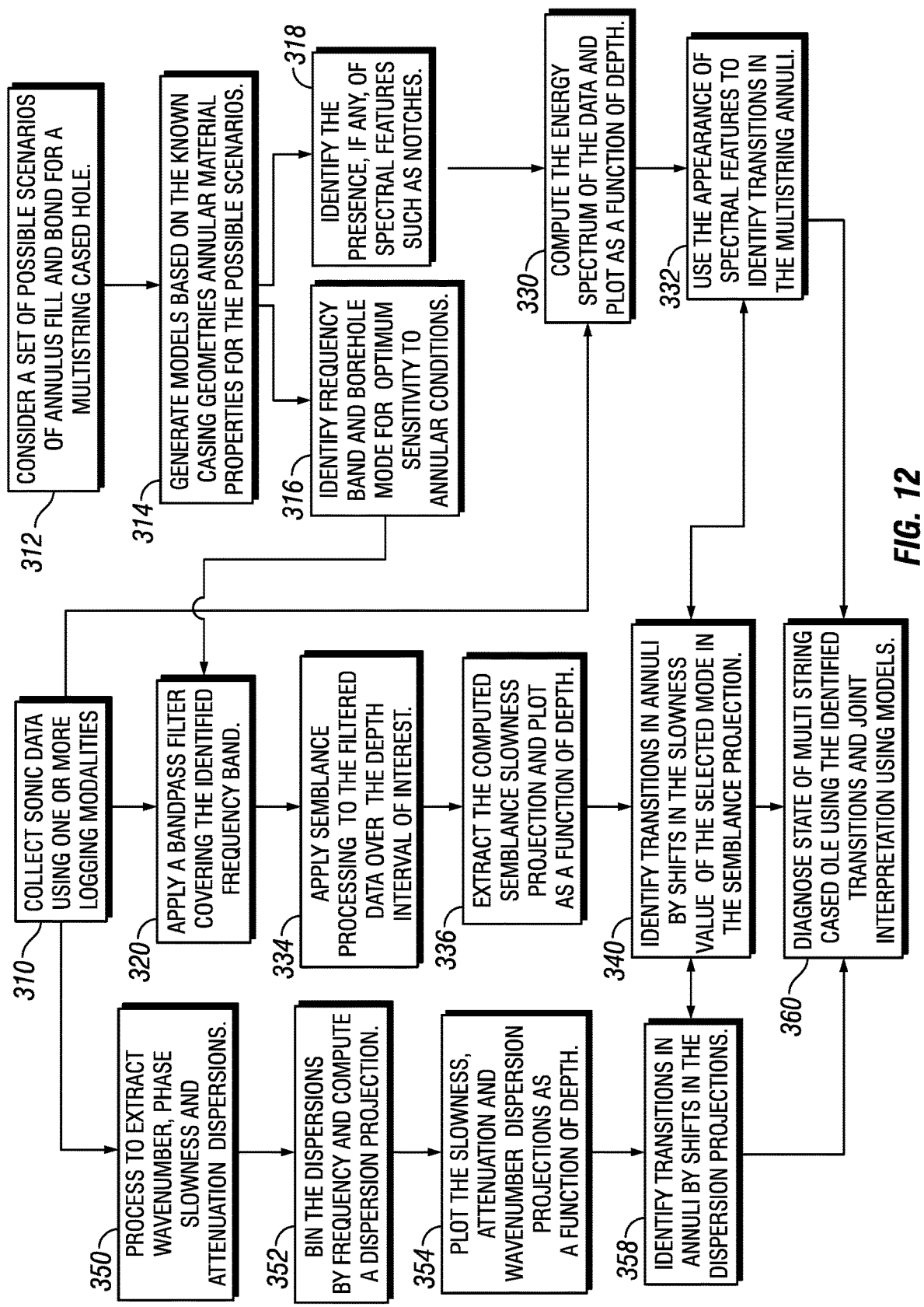
FIG. 12 is a flow chart of an embodiment that identifies the state of a multi-string cased hole using identified transitions obtained through the processing of sonic data.

The work-flow of another embodiment is seen in FIG. 12, where visible shifts over wellbore depth in one or more projections obtained by processing sonic data are utilized to diagnose the state of a multi-string cased hole. More particularly, at 310, sonic data is collected using one or more logging modalities such as monopole and dipole logging. At 320, a bandpass filter for an identified frequency band is applied to the data. The frequency band utilized at 320 is identified by: (i) considering a set of possible scenarios regarding the annuli surrounding the casings of a multistring cased hole at 312; (ii) generating models based on the known casing geometries and annular material properties for the possible scenarios at 314; and (iii) identifying a frequency band and borehole mode for optimum sensitivity to annular conditions at 316. The models generated at 314 are also used at 318 to identify the presence, if any, of spectral features such as notches as explained hereinafter with reference to FIGS. 13b and 14b. The notches may then be used at 330 in conjunction with the sonic data from 310 to compute the energy spectrum of the data and plot the energy spectrum (FIGS. 13b and 14b) as a function of depth. In turn, and as discussed in more detail hereinafter, the appearance of spectral features may be used by itself, or in conjunction with other information, to identify transitions in the multistring annuli at 332.

Returning to the bandpass filtered data, after filtering at 320, the filtered data is processed at 334 using semblance processing over a depth interval of interest. See, e.g., U.S. Pat. No. 4,594,691, issued on Jun. 10, 1986, entitled "Sonic Well Logging." The computed semblance slowness projection is then extracted and plotted as a function of depth at 336 (as seen in FIGS. 13c and 14c). From shifts in the slowness values of the selected mode in the semblance slowness projection, transitions in the annuli may be identified at 340. In addition, these transitions may be determined in conjunction with the identified spectral features found at 332 and/or in conjunction with other information.

As seen in FIG. 12, the sonic data collected by the sonic tool at 310 may also be processed to extract wavenumber, phase slowness, and attenuation dispersions at 350. See, e.g., U.S. Pat. No. 7,643,374, issued on Jan. 5, 2010, entitled "Slowness-Frequency Projection Display and Animation." Then at 352, the dispersions may be binned by frequency and dispersion projections may be computed. At 354, the slowness, attenuation and wavenumber dispersion projections may be plotted as a function of depth (as seen in FIGS. 13d-f and 14d-f). Then, at 358, transitions in the annuli may be identified by locating shifts in the dispersion projections. In addition, these transitions may be determined in conjunction with the shifts in slowness values determined at 340 and/or the appearance of spectral features determined at 332. Using the identified transitions made at one or more of 332, 340 and 358, and through joint interpretation using models, the state of the multistring cased hole may be diagnosed at 360.

Some details of the embodiment shown by the work-flow diagram of FIG. 12 are seen with reference to FIGS. 13a-13f and 14a-14f In FIG. 13a, details of a wellbore are seen along a length of 100 feet. The wellbore is seen having two casings 400a, 400b with a first annulus 410a between the two casings and a second annulus 410b between casing 400b and the formation 420. First annulus 410a is shown transitioning from hard cement 425a to oil based mud 425b at depth 970, while annulus 410b is shown transitioning from hard cement 435a to water based mud 435b at depth 940. Using monopole synthetic data generated for the geometry and materials of FIG. 13a (such as would be collected at 310 of FIG. 12), the spectrum of FIG. 14b was generated and plotted as a function of depth (330 in FIG. 12). In addition, utilizing the data generated for the geometry and materials of FIG. 13a and applying a bandpass filter and semblance processing etc., (320, 334 of FIG. 12) the semblance slowness projection of FIG. 13c was generated and plotted (336 of FIG. 12). Also, utilizing the data generated for the geometry and materials of FIG. 14a, the wavenumber, phase slowness and attenuation dispersion were extracted, binned by frequency, (350, 352 of FIG. 12) and the slowness, attenuation and wavenumber dispersion projections of FIGS. 13d-13f were plotted as a function of depth (354 of FIG. 12). It will be appreciated that transitions at depths 970 and 940 are readily observed in each of FIGS. 13b-13f (332, 340, 358 of FIG. 12). Thus, it will be appreciated that where the details of the wellbore are not known, the fact that there are transitions in the geometry and/or materials of the wellbore will still be readily observed by processing the data and conducting the workflow of FIG. 12.

The wellbore shown in FIG. 14a is very similar to the wellbore of FIG. 13a, except that light cement is utilized in the annuli in lieu of hard cement. The resulting spectrum of FIG. 14b, semblance projection of FIG. 14c, slowness dispersion projection of FIG. 14d, attenuation dispersion projection of FIG. 14e and wavenumber dispersion projection of FIG. 14f are different than, but similar to their counterparts of FIGS. 13b-13f. Thus, it will be appreciated that the transitions at depths 970 and 940 are readily observed in each of FIGS. 14b-14f.

In one embodiment, using the identified transitions located by the shifts in the projections or by the changes in spectral features, a joint interpretation of dispersion, and semblance processing output using modeled output from various scenarios can be used to diagnose the state of a multistring cased hole around the transitions.

In another embodiment, the identified transition locations found utilizing the workflow of FIG. 12 are used for the purpose of identifying more focused depth intervals of interest in the workflow of FIG. 5. Thus, with the knowledge that there are transitions at depths of 970 and 940, a decision may be made to aggregate data from depth 985 to depth 970 for processing and from depth 970 to depth 955, from depth 955 to depth 940, and from depth 940 to depth 925. Then, cut-off modes, if present, would be identified in the aggregated slowness dispersion plots. Cut-off mode templates could then be utilized to help determine whether one annulus or both of the annuli contain fluid, and if only one annulus contains fluid, which of the two annuli contains fluid and which contains cement.

In one aspect, some of the methods and processes described above, such as (by way of example only) generating dispersion curves, processing monopole and/or dipole sonic data to extract phase slowness, comparing cut-off mode templates to cut-off mode possibilities, computing measures of fit, generating plots of spectra, semblance projections, slowness-dispersion projections, attenuation-dispersion projections, etc., are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCM-CIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe the use of particular sonic tools, other tools may be utilized. Also, while particular variables and selected possibilities for a number of the variables such as four possibilities for formation slowness, two possibilities for cement slowness, etc. are described, it will be appreciated that other numbers of possibilities can be used for each of the variables, and if desired, other variables could be utilized. Also, while monopole signal processing was discussed in conjunction with the use of spectral features in identifying a transition in the status of one or more annulus surrounding casings of a wellbore, it will be appreciated that dipole signal processing or dipole signal processing in conjunction with monopole signal processing can be utilized. Accordingly, all such modifications are intended to be included within the scope of this disclosure as defined in the following claims.

What is claimed is:

1. A method of investigating a multi-string wellbore, the method comprising:

performing sonic measurements along a length in the wellbore using a sonic tool to obtain sonic data for multiple locations along the length in the wellbore;

processing the sonic data to obtain phase slowness dispersions for the multiple locations in the wellbore;

aggregating the phase slowness dispersions to obtain aggregated phase slowness dispersions;

comparing the aggregated phase slowness dispersions with a plurality of cut-off mode templates in order to identify the presence of cut-off modes or the lack thereof in the aggregated phase slowness dispersions; and identifying features of the multi-string wellbore based on presence of the cut-off modes or lack thereof.

2. The method of claim 1, further comprising generating a plurality of cut-off mode templates.

3. The method of claim 2 wherein the generating comprising generating a plurality of cut-off mode templates by modeling multi-string wellbore scenarios with different annuli conditions.

4. The method of claim 3, wherein the generating a plurality of cut-off mode templates models multi-string wellbore scenarios with different annuli conditions and at least one of different formation slowness conditions and different cement slowness conditions.

5. The method of claim 3, wherein the different annuli conditions include (i) presence of cement or lack thereof in an inner annulus, (ii) presence of cement or lack thereof in an outer annulus, (ii) presence of liquid or lack thereof in the inner annulus, and (iv) presence of liquid or lack thereof in the outer annulus.

6. The method of claim 1, wherein the comparing comprises computing a measure of fit between the aggregated phase slowness dispersions and each cut-off mode template.

7. The method of claim 6, further comprising identifying presence of cut-off modes represented in the aggregated phase slowness dispersions, and modifying at least one cut-off mode template by refitting the at least one cut-off mode template to the aggregated phase slowness dispersions.

8. The method of claim 1, wherein the features comprise (i) presence of cement or lack thereof in an inner annulus, (ii) presence of cement or lack thereof of cement in an outer annulus, (ii) presence of liquid or lack thereof in the inner annulus, and (iv) presence of liquid or lack thereof in the outer annulus.

9. The method of claim 1, wherein the length in the wellbore over which the phase slowness dispersions are aggregated is between 15 and 25 feet.

10. The method of claim 1, wherein the sonic data comprises dipole sonic data.

11. A system comprising:

a sonic logging tool configured to perform sonic measurements along a length in a multi-string wellbore to obtain sonic data for multiple locations along the length in the wellbore; and a processor configured to (i) process the sonic data to obtain phase slowness dispersions for the multiple locations in the wellbore; (ii) aggregate the phase slowness dispersions to obtain aggregated phase slowness dispersions; (iii) compare the aggregated phase slowness dispersions with a plurality of cut-off mode templates in order to identify the presence of cut-off modes or the lack thereof in the aggregated phase slowness dispersions; and (iv) identify features of the multi-string wellbore based on presence of the cut-off modes or lack thereof.

12. A method of investigating a multi-string wellbore having a plurality of casings and a plurality of annuli, the method comprising:
- performing sonic measurements along a depth interval in the wellbore using a sonic tool to obtain sonic data for multiple locations along the depth interval in the wellbore;
- processing the sonic data to obtain indications as a function of depth in the depth interval of at least one of an energy spectrum, an attenuation dispersion projection, a slowness dispersion projection, and a wavenumber dispersion projection; and
- identifying a shift in at least one of the indications at a particular depth in the depth interval, wherein the shift represents a transition in the makeup of material in at least one annulus of the plurality of annuli.

13. The method of claim 12, wherein the processing the sonic data comprises applying a bandpass filter to the sonic data, applying semblance processing to the bandpass filtered data over the depth interval, extracting the computed semblance slowness projection, and plotting the computed semblance slowness projection as a function of depth.

14. The method of claim 12, wherein the processing the sonic data comprises (i) extracting at least one of a wavenumber dispersion, a phase slowness dispersion, and an attenuation dispersion, (ii) binning the at least one dispersion by frequency, and (iii) computing at least one dispersion projection, and (iv) plotting the at least one dispersion projection as a function of depth.

15. The method of claim 12, wherein the identifying a shift in at least one of the indications at a particular depth in the depth interval comprises identifying a shift in a plurality of the indications at a particular depth in the depth interval.

16. The method of claim 12, wherein the sonic data comprises at least one of monopole and dipole sonic data.

17. The method of claim 12, further comprising using the particular depth of the depth interval to select a focused depth interval;
- aggregating the indications of phase slowness dispersions over the focused depth interval to obtain aggregated phase slowness dispersions;
- comparing the aggregated phase slowness dispersions with a plurality of cut-off mode templates in order to identify presence of cut-off modes or lack thereof in the aggregated phase slowness dispersions over the focused depth interval; and
- identifying features of the multi-string wellbore based on presence of the cut-off modes or lack thereof.

18. The method of claim 17, further comprising generating a plurality of cut-off mode templates.

19. The method of claim 18 wherein the generating comprises generating a plurality of cut-off mode templates by modeling multi-string wellbore scenarios with different annuli conditions.

20. The method of claim 19, wherein the different annuli conditions include (i) presence of cement or lack thereof in an inner annulus, (ii) presence of cement or lack thereof in an outer annulus, (ii) presence of liquid or lack thereof in the inner annulus, and (iv) presence of liquid or lack thereof in the outer annulus.

21. The method of claim 17, wherein the comparing comprises computing a measure of fit between the aggregated phase slowness dispersions and each cut-off mode template.

22. The method of claim 17, wherein the features comprise (i) presence of cement or lack in an inner annulus, (ii) presence of cement or lack thereof in an outer annulus, (ii) presence of liquid or lack thereof in the inner annulus, and (iv) presence of liquid or lack thereof in the outer annulus.

23. The method of claim 17, wherein the focused depth over which indications of phase slowness dispersions are aggregated is between 15 and 25 feet.

* * * * *